US010396612B2

(12) United States Patent
Nakano et al.

(10) Patent No.: US 10,396,612 B2
(45) Date of Patent: Aug. 27, 2019

(54) PERMANENT MAGNET TYPE CONCENTRATED WINDING MOTOR

(75) Inventors: Masatsugu Nakano, Chiyoda-ku (JP); Satoru Akutsu, Chiyoda-ku (JP); Yoshihito Asao, Chiyoda-ku (JP); Yuji Takizawa, Chiyoda-ku (JP); Yu Hirotani, Chiyoda-ku (JP); Ryuichi Takiguchi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1537 days.

(21) Appl. No.: 14/345,128

(22) PCT Filed: Dec. 2, 2011

(86) PCT No.: PCT/JP2011/077945
§ 371 (c)(1),
(2), (4) Date: Mar. 14, 2014

(87) PCT Pub. No.: WO2013/080374
PCT Pub. Date: Jun. 6, 2013

(65) Prior Publication Data
US 2014/0346910 A1      Nov. 27, 2014

(51) Int. Cl.
*H02K 1/27* (2006.01)
*H02K 3/28* (2006.01)
(Continued)

(52) U.S. Cl.
CPC ............. *H02K 3/28* (2013.01); *B62D 5/0463* (2013.01); *H02K 1/274* (2013.01); *H02K 21/16* (2013.01)

(58) Field of Classification Search
CPC .......... H02K 3/28; H02K 1/274; H02K 21/16; B62D 5/0463
(Continued)

(56) References Cited

U.S. PATENT DOCUMENTS 5,200,662 A * 4/1993 Tagami ................ H02K 1/2773
310/114
5,378,953 A * 1/1995 Uchida .................. H02K 21/14
310/156.57
(Continued)

FOREIGN PATENT DOCUMENTS

DE       102008054284 A1    5/2010
EP          1244195 A1       9/2002
(Continued)

OTHER PUBLICATIONS

Nidec Inc., "Part Winding", http://acim.nidec.com/motors/usmotors/techdocs/profacts/starting-methods/part-winding, 2018.*
(Continued)

*Primary Examiner* — John K Kim
(74) *Attorney, Agent, or Firm* — Sughrue Mion, PLLC; Richard C. Turner

(57) ABSTRACT

In a permanent magnet type concentrated winding motor, the number of magnetic poles is M, a stator Sr has an N number of teeth T around which coils are concentratedly wound and which are circumferentially arranged at equal intervals, M is equal to (18±4)n and N is equal to 18n, an armature winding AW has an m number of parallel circuits, and a 1-phase circuit of the parallel circuits is configured to have a 6n/m number of coils connected in series with each other.

10 Claims, 19 Drawing Sheets

(51) Int. Cl.
  *B62D 5/04* (2006.01)
  *H02K 21/16* (2006.01)
(58) Field of Classification Search
  USPC ......... 310/179–210, 156.01, 156.45, 156.53, 310/132, 134, 156.56
  See application file for complete search history.

(56) References Cited

U.S. PATENT DOCUMENTS

| | | | | |
|---|---|---|---|---|
| 6,351,050 | B1* | 2/2002 | Coles | H02K 1/2766 180/443 |
| 8,742,615 | B2* | 6/2014 | Gopalakrishnan | B60L 11/1868 307/9.1 |
| 2002/0101126 | A1* | 8/2002 | Crapo | B62D 5/0403 310/156.01 |
| 2002/0130578 | A1 | 9/2002 | Anma et al. | |
| 2003/0048017 | A1* | 3/2003 | Nakano | H02K 29/03 310/152 |
| 2003/0110771 | A1 | 6/2003 | Morgan et al. | |
| 2003/0132724 | A1* | 7/2003 | Arimitsu | H02P 5/74 318/41 |
| 2004/0264075 | A1* | 12/2004 | Kolomeitsev | B62D 5/0403 361/23 |
| 2005/0269895 | A1* | 12/2005 | Innami | B62D 5/0403 310/429 |
| 2006/0017290 | A1* | 1/2006 | Murty | F02N 11/04 290/36 R |
| 2006/0220486 | A1* | 10/2006 | Miyashita | H02K 3/28 310/179 |
| 2006/0250116 | A1* | 11/2006 | Walter | H02M 5/22 322/89 |
| 2006/0284510 | A1* | 12/2006 | Tauvron | H02K 1/185 310/180 |
| 2008/0116834 | A1* | 5/2008 | Namuduri | B62D 5/008 318/610 |
| 2009/0184717 | A1* | 7/2009 | Ivan | G01R 19/16547 324/522 |
| 2009/0269043 | A1* | 10/2009 | Namuduri | B62D 5/046 388/819 |
| 2010/0096943 | A1 | 4/2010 | Yamaguchi | |
| 2010/0289370 | A1* | 11/2010 | Roth | H02K 1/276 310/156.53 |
| 2010/0327787 | A1 | 12/2010 | Sakai et al. | |
| 2011/0043069 | A1* | 2/2011 | Tanaka | H02K 3/28 310/198 |
| 2011/0316368 | A1 | 12/2011 | Dajaku | |
| 2012/0194040 | A1* | 8/2012 | Hao | H02K 3/28 310/68 D |
| 2012/0206076 | A1* | 8/2012 | Tanaka | H02M 7/53873 318/400.28 |
| 2012/0319542 | A1 | 12/2012 | Hazeyama et al. | |
| 2016/0365821 | A1* | 12/2016 | Hustedt | H02P 27/085 |

FOREIGN PATENT DOCUMENTS

| | | |
|---|---|---|
| EP | 2180580 A2 | 4/2010 |
| JP | 05-344668 A | 12/1993 |
| JP | 06-346747 A | 12/1994 |
| JP | 2002-272074 A | 9/2002 |
| JP | 2003-032983 A | 1/2003 |
| JP | 2003-161157 A | 6/2003 |
| JP | 2006-050709 A | 2/2006 |
| JP | 2006050709 A | 2/2006 |
| JP | 2009-201300 A | 9/2009 |
| JP | 2010-124527 A | 6/2010 |
| JP | 2010-531130 A | 9/2010 |
| WO | 2011/093202 A1 | 8/2011 |

OTHER PUBLICATIONS

J. Cros et al, "BLDC Motors with surface mounted PM rotor for wide constant power operation", IEEE, 2003.*
Communication dated Sep. 18, 2015 from the European Patent Office issued in corresponding European application No. 11876506.4.
Communication dated Aug. 5, 2014, issued by the Japanese Patent Office in counterpart Japanese application No. 2013-546935.
International Search Report of PCT/JP2011/077945 dated Mar. 6, 2012.

* cited by examiner

PERMANENT MAGNET TYPE CONCENTRATED WINDING MOTOR

CROSS REFERENCE TO RELATED APPLICATIONS

This application is a National Stage of International Application No. PCT/JP2011/077945 filed Dec. 2, 2011, the contents of all of which are incorporated herein by reference in their entirety.

TECHNICAL FIELD

The present invention relates to a permanent magnet type concentrated winding motor, particularly a permanent magnet type concentrated winding motor that is used in an electric power steering apparatus for a vehicle or the like.

BACKGROUND ART

In the related art, a structure in which a winding is wound in a concentrated manner around teeth of a stator, that is, the structure of a concentrated winding motor, is disclosed (Patent Literature 1). The concentrated winding motor disclosed in Patent Literature 1 has a structure in which an eddy-current loss can be greatly reduced even though a massive yoke is used in a rotor. In addition, Patent Literature 2 discloses the pulsation frequencies of cogging torque and winding factors of various concentrated winding permanent magnet motors.

Patent Literature 1: JP-A-2001-054271 (drawing and description in abstract)

Patent Literature 2: JP-A-9-172762 (drawing and description in abstract)

DISCLOSURE OF INVENTION

Technical Problem

However, the structures in Patent Literatures 1 and 2 have problems such as vibration and noise caused by a low-spatial order electromagnetic excitation force or machinability of a winding.

The present invention is made to solve the problems, and an object of the present invention is to reduce a low-spatial order electromagnetic excitation force and to improve machinability of a winding. Furthermore, another object of the present invention is to obtain a concentrated winding motor that is low in vibration and noise caused by current unbalance.

Solution to Problem

In a permanent magnet type concentrated winding motor according to the present invention, a rotor has magnetic poles that are configured to have magnetized permanent magnets, the number of magnetic poles is M, a stator has teeth around which coils are wound in a concentrated manner and which are circumferentially arranged at equal intervals, the number of teeth is N, the number of poles M is equal to $(18\pm4)n$ and the number of teeth N is equal to $18n$ (n is an integer and $n\geq 1$), an armature winding formed by the coils is configured to have an m number of 3-phase armature windings that form parallel circuits (m is an even number that is 2 or greater, and is a divisor of 2n), and a 1-phase circuit of each of the 3-phase armature windings that form the parallel circuits is configured to have a $6n/m$ number of coils connected in series with each other. A torque ripple also is small, low vibration and low noise are obtained, a winding space factor is improved and machinability is improved.

Advantageous Effects of Invention

In the present invention, the rotor has the magnetic poles that are configured to have the magnetized permanent magnets, the number of magnetic poles is M, the stator has the teeth around which the coils are wound in a concentrated manner and which are circumferentially arranged at equal intervals, the number of teeth is N, the number of poles M is equal to $(18\pm4)n$ and the number of teeth N is equal to $18n$ (n is an integer and $n\geq 1$), the armature winding formed by the coils is configured to have the m number of 3-phase armature windings that form the parallel circuits (m is an even number that is 2 or greater, and is a divisor of 2n), and the 1-phase circuit in each of the 3-phase armature windings which form the parallel circuits is configured to have the $6n/m$ number of coils connected in series with each other and thus, a high-efficiency motor with a small size is obtained and a torque ripple also is small. Furthermore, since the second-spatial order electromagnetic excitation force is small, low vibration and low noise are obtained. In addition, since it is possible to make a winding thin, a winding space factor is improved and machinability is improved.

BRIEF DESCRIPTION OF DRAWINGS

FIG. 6 is a view of an example comparing an electromagnetic excitation force of a motor in the related art and an electromagnetic excitation force of the motor according to the present invention.

BEST MODE FOR CARRYING OUT THE INVENTION

Embodiment 1

Figure 1:
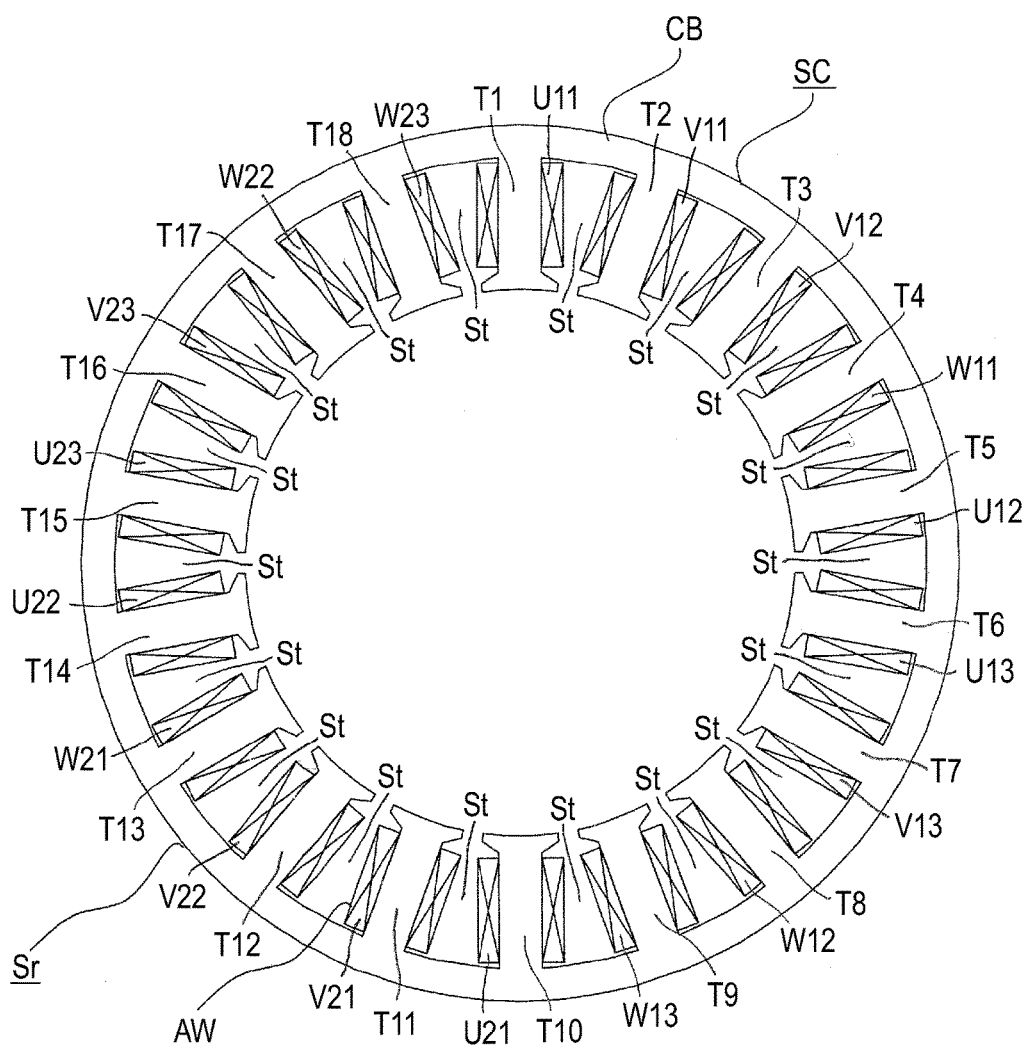
FIG. 1 is a view illustrating Embodiment 1 according to the present invention, and is a vertical cross-sectional front view of a stator of a permanent magnet type concentrated winding motor.
Figure 2:
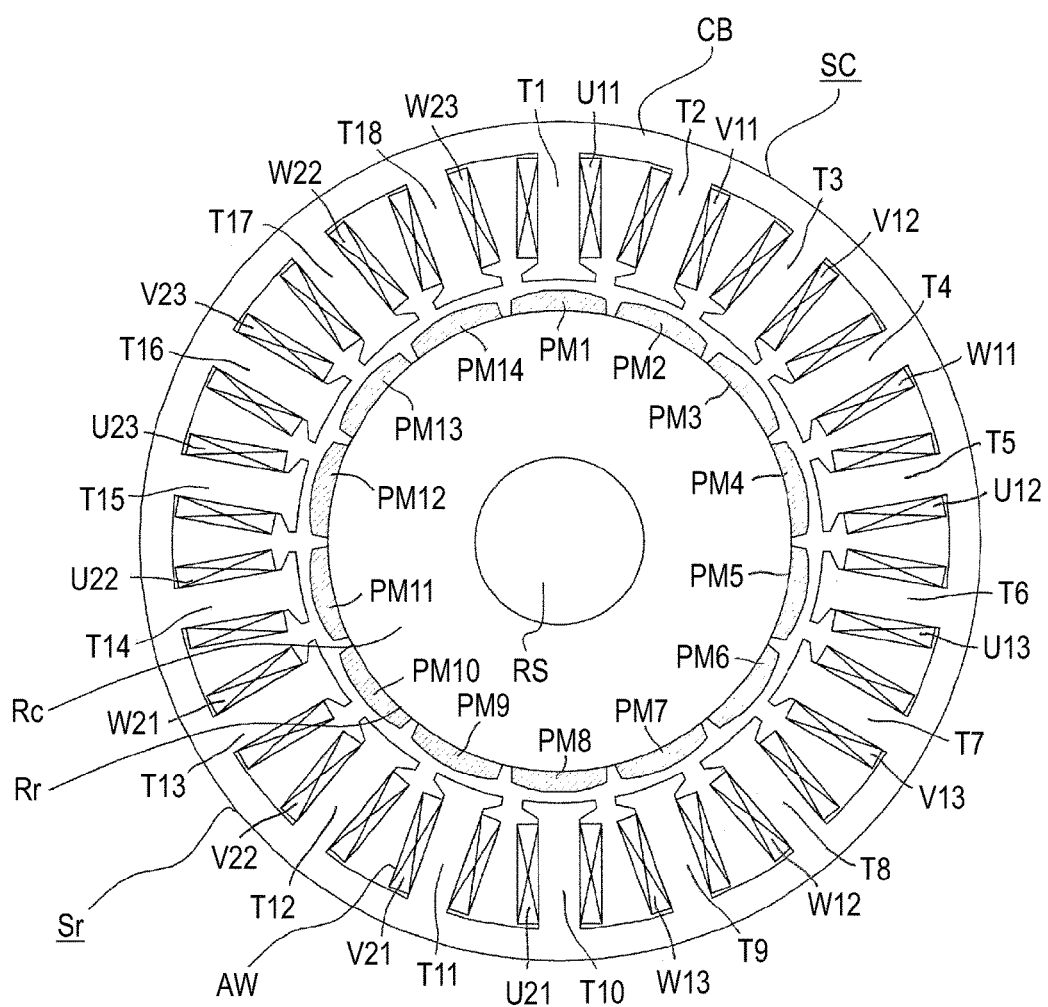
FIG. 2 is a view illustrating Embodiment 1 according to the present invention, and is a vertical cross-sectional front view of a surface permanent magnet type concentrated winding motor.
Figure 3:
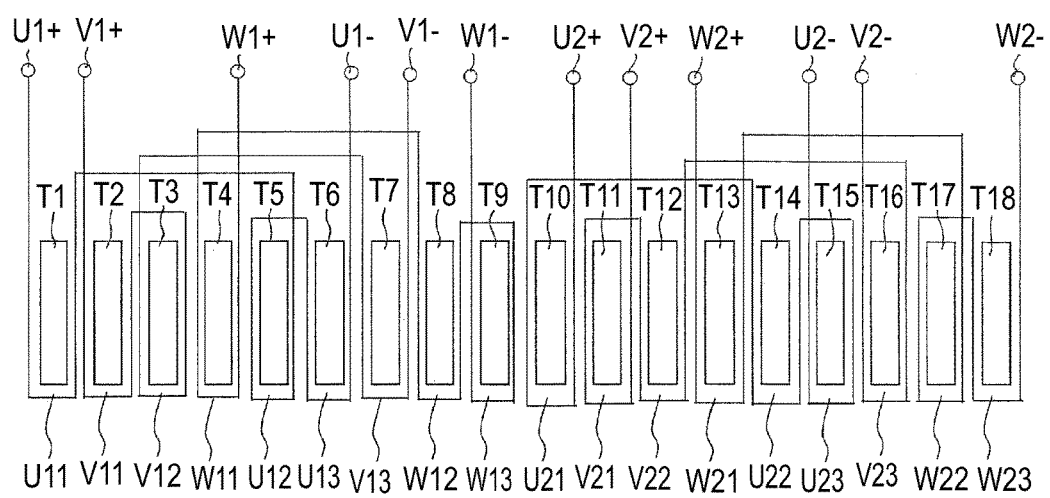
FIG. 3 is a view illustrating Embodiment 1 according to the present invention, and is a view describing a wire connection of an armature winding.
Figure 4:
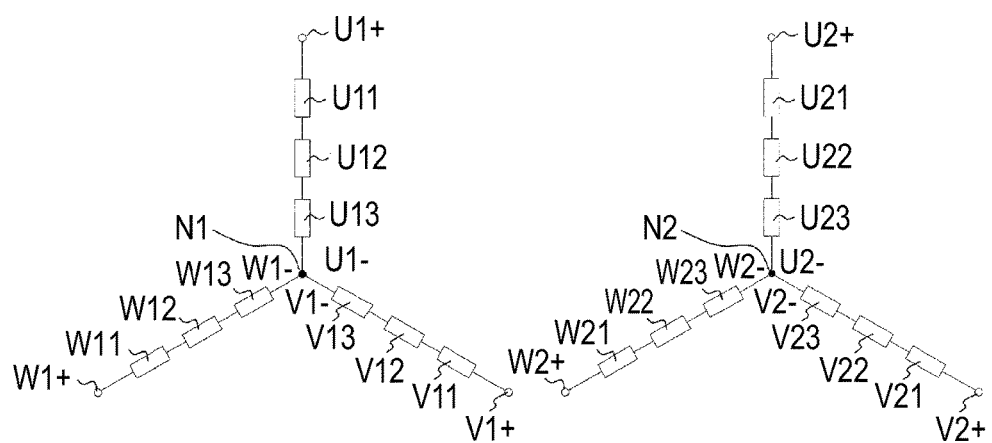
FIG. 4 is a view illustrating Embodiment 1 according to the present invention, and is a view describing a Y wire connection of the armature winding.
Figure 5:
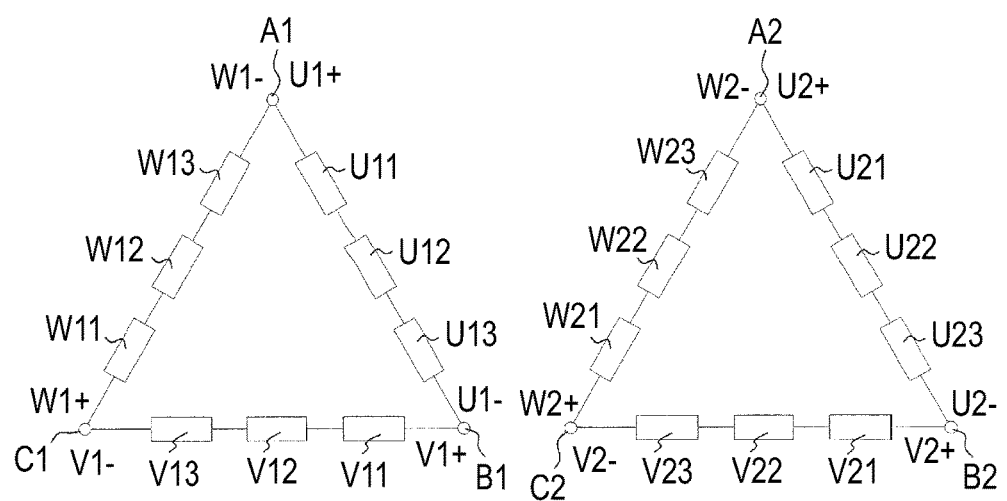
FIG. 5 is a view illustrating Embodiment 1 according to the present invention, and is a view describing a Δ wire connection of the armature winding.
Figure 6A:
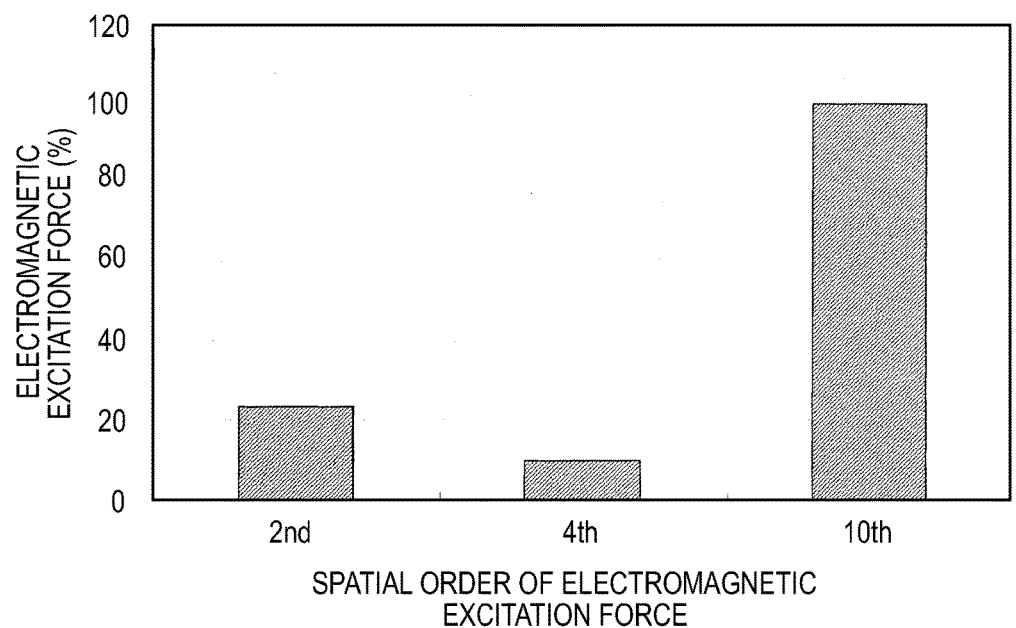
FIG. 6A is a view describing an electromagnetic excitation force of the motor in the related art.
Figure 6B:
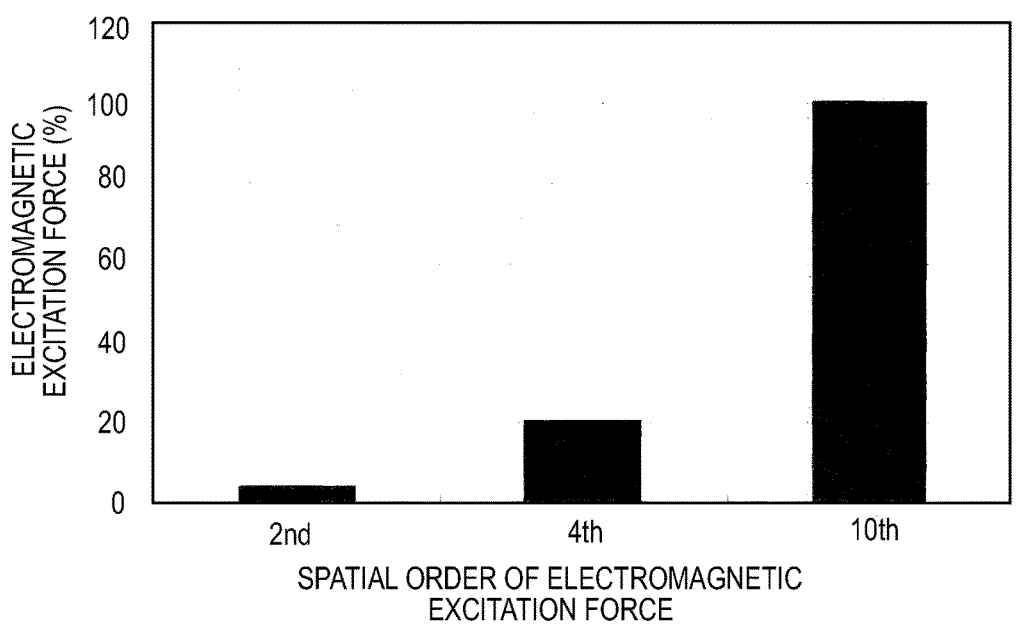
FIG. 6B is a view describing an example of an electromagnetic excitation force of the motor in Embodiment 1 according to the present invention.
Figure 7:
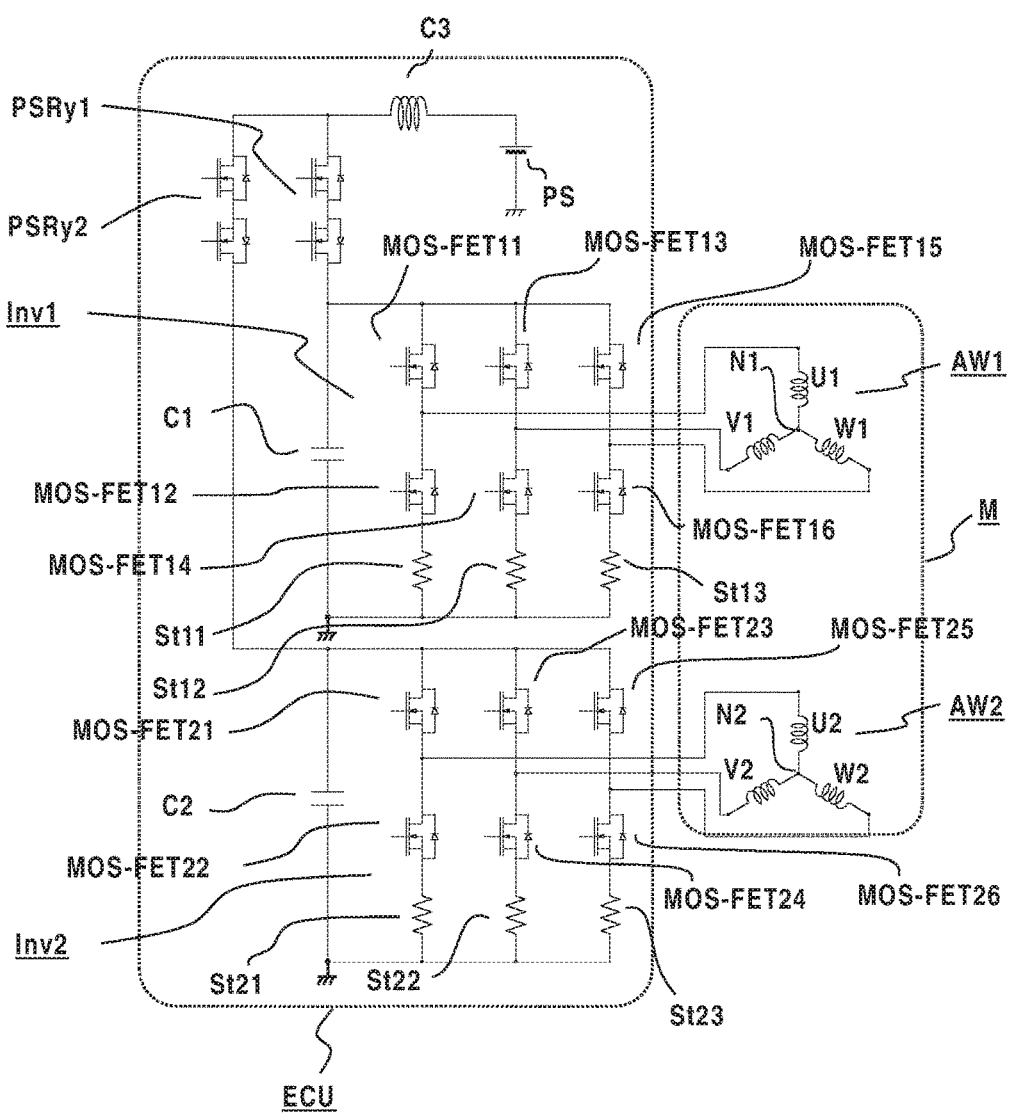
FIG. 7 is a view illustrating Embodiment 1 according to the present invention, and is a view describing circuits of two inverters.
Figure 8:
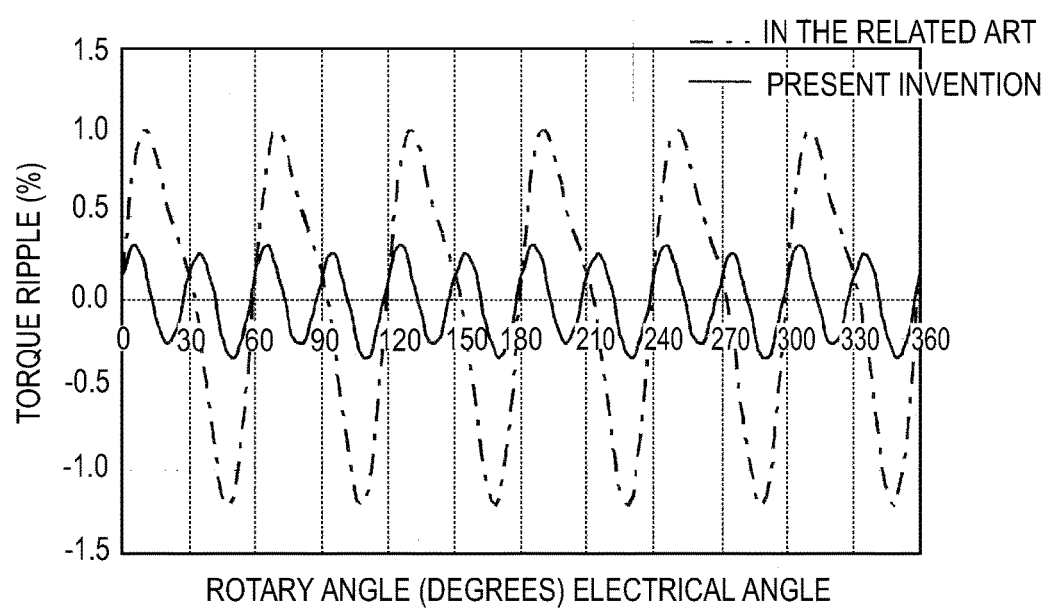
FIG. 8 is a view illustrating Embodiment 1 according to the present invention, and is a view describing a waveform of a torque ripple.

Hereinafter, Embodiment 1 according to the present invention will be described with reference to FIGS. 1 to 8. FIG. 1 is a vertical cross-sectional front view of a stator of a permanent magnet type concentrated winding motor. FIG. 2 is a vertical cross-sectional front view of a surface permanent magnet type concentrated winding motor. FIG. 3 is a view describing a wire connection of an armature winding. FIG. 4 is a view describing a Y wire connection of the armature winding. FIG. 5 is a view describing a Δ wire connection of the armature winding. FIG. 6 is a view of an example comparing an electromagnetic excitation force of a motor in the related art and an electromagnetic excitation force of the motor according to the present invention, and FIG. 6A is a view describing an electromagnetic excitation force of the motor in the related art, and FIG. 6B is a view describing an example of an electromagnetic excitation force of the motor according to the present invention. FIG. 7 is a view describing circuits of two inverters. FIG. 8 is a view describing a waveform of a torque ripple.

In FIG. 1, a stator Sr has an annular core back CB; a total of eighteen of teeth T1 to T18 that radially extend from the core back CB; a stator core SC that is provided with a slot St between two adjacent teeth; and an armature winding AW that is wound in a concentrated manner around each of the teeth. For simplification purpose, FIG. 1 does not illustrate an insulator provided between the armature winding AW and the stator core SC or a frame provided in a circumference of the stator core SC. In addition, for convenience, numerals 1 to 18 are assigned to the teeth.

Hereinafter, a portion in which the armature winding AW is wound in a concentrated manner in a form of coil around each of the teeth T1 to T18 is referred to as a "coil".

For convenience, a numeral is assigned to each coil being wound in a concentrated manner around each of the teeth T1 to T18 so as to illustrate which one of U-, V- and W-phase coils each coil indicates. The U-phase coils are configured to have six coils U11, U12, U13, U21, U22 and U23, the V-phase coils are configured to have six coils V11, V12, V13, V21, V22 and V23 and the W-phase coils are configured to have six coils W11, W12, W13, W21, W22 and W23. As illustrated in FIG. 1, the coils U11, V11, V12, W11, U12, U13, V13, W12, W13, U21, V21, V22, W21, U22, U23, V23, W22 and W23 are arranged sequentially in a row to correspond to the teeth T1 to T18, respectively.

A way that the eighteen coils are connected with each other will be described later in detail.

In FIG. 2 that is a view describing a cross-section of a permanent magnet type concentrated winding motor M according to Embodiment 1, in the motor M, the number of magnetic poles (the number of poles) of a rotor Rr is 14, and the number of slots St (the number of slots) of the stator Sr is 18. The rotor Rr is rotatably provided inside the stator Sr in FIG. 1.

The rotor Rr has a shaft RS that is a rotary shaft, and a rotor core RC provided outside the shaft. Furthermore, fourteen magnetic poles PM1 to PM14 of the permanent magnet are bonded to a circumferential side of the rotor core RC at circumferentially equal intervals.

A cover is not illustrated in FIG. 2, but there is a case where a cylindrical cover made of a nonmagnetic material such as stainless steel or aluminum for protection of the magnet and prevention of spattering is provided outside the permanent magnet.

FIG. 3 is a view describing a wire connection of the armature winding, and a view describing how the eighteen coils U11, V11, V12, W11, U12, U13, V13, W12, W13, U21, V21, V22, W21, U22, U23, V23, W22 and W23 are electrically connected with each other.

Eighteen rectangles in a row indicate the teeth T1 to T18, and the coils wound around the teeth T1 to T18 are indicated by the coils U11, V11, V12, W11, U12, U13, V13, W12, W13, U21, V21, V22, W21, U22, U23, V23, W22 and W23.

The coils U11, U12 and U13 are connected in series with each other, and configure a U1 phase winding which is a first U-phase winding. At this time, the coil U12 has a coil winding direction opposite to that of the coils U11 and U13.

The coils U21, U22 and U23 are connected in series with each other, and configure a U2 phase winding which is a second U-phase winding. At this time, the coil U22 has a coil winding direction opposite to that of the coils U21 and U23.

The coils V11, V12 and V13 are connected in series with each other, and configure a V1 phase winding which is a first V-phase winding. At this time, the coil V12 has a coil winding direction opposite to that of the coils V11 and V13.

The coils V21, V22 and V23 are connected in series with each other, and configure a V2 phase winding which is a second V-phase winding. At this time, the coil V22 has a coil winding direction opposite to that of the coils V21 and V23.

The coils W11, W12 and W13 are connected in series with each other, and configure a W1 phase winding which is a first W-phase winding. At this time, the coil W12 has a coil winding direction opposite to that of the coils W11 and W13.

The coils W21, W22 and W23 are connected in series with each other, and configure a W2 phase winding which is a second W-phase winding. At this time, the coil W22 has a coil winding direction opposite to that of the coils W21 and W23.

In addition, both ends of the U1 phase winding have U1+ on a side of the coil U11, and U1− on a side of the coil U13. Similarly, both ends of the U2 phase winding have U2+ on a side of the coil U21, and U2− on a side of the coil U23.

Similarly, both ends of the V1 phase winding have V1+ on a side of the coil V11, and V1− on a side of the coil V13. Similarly, both ends of the V2 phase winding have V2+ on a side of the coil V21, and V2− on a side of the coil V23.

Similarly, both ends of the W1 phase winding have W1+ on a side of the coil W11, and W1− on a side of the coil W13. Similarly, both ends of the W2 phase winding have W2+ on a side of the coil W21, and W2− on a side of the coil W23.

FIG. 4 is a view describing a Y wire connection of the U1, U2, V1, V2, W1 and W2 phase windings in FIG. 3. In a left side view of FIG. 4, U1−, V1− and W1− are electrically connected with each other by a Y wire connection having N1 as a neutral point. In contrast, in a right side view, U2−, V2− and W2− are electrically connected with each other by a Y wire connection having N2 as a neutral point.

FIG. 7 is a view illustrating circuits of the motor M and an electronic control unit (ECU) according to Embodiment 1.

The motor M is a permanent magnet type concentrated winding motor in which the number of poles is 14 and the number of slots is 18 as illustrated in FIGS. 1 to 4. For simplification purpose, in FIG. 7, the details are not illustrated and only the armature winding AW is illustrated.

The armature winding AW of the motor M is configured to have an armature winding AW1 formed by the first U-phase winding U1, the first V-phase winding V1 and the first W-phase winding W1, and an armature winding AW2 formed by the second U-phase winding U2, the second V-phase winding V2 and the second W-phase winding W2.

For simplification purposes, details of the electronic control unit (ECU) are also omitted, and only a power circuit portion of the inverters is illustrated. The electronic control unit (ECU) is configured to have circuits of two inverters Inv1 and Inv2, and the inverters supply a 3-phase current to the two armature windings AW1 and AW2, respectively.

A direct current is supplied to the electronic control unit (ECU) from a power supply PS such as a battery, and a power supply relay PSRy is connected to the inverters via a coil C1 for noise removal.

In FIG. 7, the power supply PS is illustrated as being inside the electronic control unit (ECU), but in practicality, electrical power is supplied from an external power supply such as a battery via a connector.

The power supply relay PSRy is configured to have two power supply relays PSRy1 and PSRy2, and each of the power supply relays PSRy1 and PSRy2 is configured to have two MOS-FETs that are electronically controllable switching elements. In a malfunction situation or the like, the power supply relays PSRy1 and PSRy2 are opened and an overcurrent is prevented from flowing.

Hereinafter, the electronically controllable switching element is abbreviated to the "MOS-FET".

In FIG. 7, the power supply PS, the coil C3 and the power supply relays PSRy1 and PSRy2 are connected in the sequence listed, but the power supply relays PSRy1 and PSRy2 may be provided at positions closer to the power supply than the coil C3.

Capacitors C1 and C2 are smoothing capacitors. In FIG. 7, each of the inverter circuits is configured to have one capacitor, but may be configured to have a plurality of capacitors connected in parallel with each other.

Each of the inverters Inv1 and Inv2 is configured to have a bridge using six MOS-FETs. In the inverter Inv1, a MOS-FET11 and a MOS-FET12 are connected in series with each other, a MOS-FET13 and a MOS-FET14 are connected in series with each other, a MOS-FET15 and a MOS-FET16 are connected in series with each other, and three pairs of MOS-FETs are connected in parallel with each other. Furthermore, a shunt resistor St is connected to each of ground (GND) sides of the three MOS-FET12, MOS-FET14 and MOS-FET16 on a lower side, and as illustrated in FIG. 7, the shunt resistors St are indicated by a shunt resistor St11, a shunt resistor St12 and a shunt resistor St13, respectively. The shunt resistors St11, St12 and St13 are used to detect a current value.

The example illustrates a case where three shunt resistors are configured, but two shunt resistors may be configured. Since it is possible to detect a current with only one shunt resistor, one shunt resistor may be configured.

As illustrated in FIG. 7, a current is supplied to the U1 phase winding of the motor M from between the MOS-FET11 and the MOS-FET12 via a connection conductor such as a bus bar, a current is supplied to the V1 phase winding of the motor M from between the MOS-FET13 and the MOS-FET14 via a connection conductor such as a bus bar and a current is supplied to the W1 phase winding of the motor M from between the MOS-FET15 and the MOS-FET16 via a connection conductor such as a bus bar.

The inverter Inv2 also has the same configuration. In the inverter Inv2, a MOS-FET21 and a MOS-FET22 are connected in series with each other, a MOS-FET23 and a MOS-FET24 are connected in series with each other, a MOS-FET25 and a MOS-FET26 are connected in series with each other, and three pairs of MOS-FETs are connected in parallel with each other. Furthermore, a shunt resistor St is connected to each of ground (GND) sides of three MOS-FET22, MOS-FET24 and MOS-FET26 on a lower side, and as illustrated in FIG. 7, the shunt resistors St are indicated by a shunt resistor St21, a shunt resistor St22 and a shunt resistor St23. The shunt resistors St21, St22 and St23 are used to detect a current value.

The example illustrates a case where three shunt resistors are configured, but two shunt resistors may be configured. Since it is possible to detect a current with only one shunt resistor, one shunt resistor may be configured.

As illustrated in FIG. 7, a current is supplied to the U2 phase winding of the motor M from between the MOS-FET21 and the MOS-FET22 via a connection conductor such as a bus bar, a current is supplied to the V2 phase winding of the motor M from between the MOS-FET23 and the MOS-FET24 via a connection conductor such as a bus bar and a current is supplied to the W2 phase winding of the motor M from between the MOS-FET25 and the MOS-FET26 via a connection conductor such as a bus bar.

Based on a rotary angle detected by a rotary angle sensor (not illustrated) mounted on the motor M, when a signal is sent to the MOS-FET from a control circuit (not illustrated), the two inverters Inv1 and Inv2 are switched to supply a desired 3-phase current to the armature windings AW1 and AW2. A resolver sensor, a GMR sensor, an MR sensor or the like is used as the rotary angle sensor.

When the permanent magnet type concentrated winding motor has the configuration like this, the following effects are obtained.

FIG. 6A is a view in which an electromagnetic excitation force of a permanent magnet type motor in the related art is graphed. Since magnetic flux density of an air gap (void) portion of a motor changes spatially and temporally, similarly, an electromagnetic force also changes spatially and temporally. FIG. 6A illustrates results when representative components are extracted from the second-temporal order electromagnetic excitation force of a permanent magnet type motor having ten poles and twelve slots in the related art as an example. The horizontal axis indicates a spatial order, the 2nd indicates the second spatial order, and similarly, the 4th indicates the fourth spatial order, and the 10th indicates the tenth spatial order. The vertical axis indicates a normalized electromagnetic excitation force when the 10th-spatial order electromagnetic excitation force is set to be 100%.

A low-spatial order electromagnetic excitation force of a motor used in an electric power steering apparatus becomes a root cause of vibration and noise. The 10th electromagnetic excitation force has an order that coincides with the number of poles, but since the order is high, the 10th electromagnetic excitation force does not cause vibration and noise. However, since the second-spatial order electromagnetic excitation force, that is, an electromagnetic excitation force that modifies the shape of a stator into an elliptical shape is present, there is a problem in that the second-spatial order electromagnetic excitation force increases vibration and noise.

FIG. 6B illustrates an electromagnetic excitation force of the permanent magnet type motor having fourteen poles and eighteen slots according to Embodiment 1. The horizontal axis indicates the spatial order of an electromagnetic excitation force, and the vertical axis indicates a normalized electromagnetic excitation force when the 10th-spatial order electromagnetic excitation force in FIG. 6A is set to be 100%.

The 14th excitation force coinciding with the number of poles is approximately 100%, but the 14th excitation force does not cause a vibration and noise problem. In contrast, the 4th excitation force is greater than that in FIG. 6A, but the 2nd excitation force that has the lowest order is greatly reduced. Since a wire connection is carried out as illustrated in FIG. 3, the second-spatial order electromagnetic excitation force is greatly reduced. Like for the coils U11, U12 and U13 or the coils U21, U22 and U23 as illustrated in FIG. 3, the reason is because the three coils dispersedly arranged within a mechanical angle of 100 degrees are connected in series with each other, and because the U1 and U2 phase windings are arranged at positions offset from each other at a mechanical angle of 180 degrees. Since the V1, V2, W1 and W2 phase windings also have the same coil connection and coil arrangement, it is possible to make the second-spatial order electromagnetic excitation force small.

In contrast, in the motor having ten poles and twelve slots, since adjacent coils, that is, two coils separated from each other at a mechanical angle of 30 degrees, are connected in series with each other, the second-spatial order electromagnetic excitation force is great.

Furthermore, when a wire connection is carried out as illustrated in FIG. 3, other effects are obtained. In FIG. 3, the U1 phase winding is configured to have the coils U11, U12 and U13 connected in series with each other, that is, the first tooth T1, the fifth tooth T5 and the sixth tooth T6 connected in series with each other. The first tooth T1 and the sixth tooth T6 are positionally separated from each other at a mechanical angle of 100 degrees, and the coils of each of the U2, V1, V2, W1 and W2 phase windings also are connected in series with each other at teeth within a mechanical angle of 100 degrees.

As such, since the coils at mechanically close positions are connected in series with each other, the wire connection is easily carried out. Furthermore, the armature winding AW is divided into the two armature windings AW1 and AW2, and electrically becomes parallel circuits of the two armature windings.

In a motor of an electric power steering apparatus, a 12 V system power supply is largely used, and when an output of the motor becomes great, there is a problem in that a current value becomes great, an armature winding becomes thick and machinability worsens. However, when the armature winding AW is configured to have two parallel circuits in this way, the wire diameter of the armature winding can be made small, and effects are obtained in which machinability is improved and a winding space factor is improved.

Furthermore, in a case where the motor is driven by the two inverters Inv1 and Inv2 as illustrated in FIG. 7, when phases of currents supplied to the armature windings AW1 and AW2 to which the two inverters correspond, respectively, are changed relative to each other, it is possible to greatly reduce a torque ripple.

FIG. 8 is a view comparing torque ripples between an example in the related art and the configuration of Embodiment 1. The horizontal axis indicates an electrical angle which is a rotary angle of a motor. The vertical axis indicates a ratio of a torque ripple to a rated torque in a % value.

In the example in the related art indicated by a dashed line, a torque ripple (sixth-order torque ripple) is seen at a frequency of an electrical angle of 60 degrees, but when the phases of the supply currents of the two inverters Inv1 and Inv2 are offset relative to each other at an electrical angle of 30 degrees as in Embodiment 1, the sixth-order torque ripples cancel each other out, the sixth-order torque ripple is reduced as indicated by a solid line in FIG. 8, and a p-p value of the torque ripple is greatly reduced.

A torque ripple is a root cause of vibration and noise in an electric power steering apparatus. In addition, a driver may feel the torque ripple and a steering feeling deteriorates.

However, since it is possible to greatly reduce a torque ripple according to Embodiment 1, vibration and noise are small, and a good steering feeling can be obtained.

FIG. 7 illustrates an example of the configuration in which neutral points N1 and N2 are not electrically connected. When the neutral points of the two armature circuits AW1 and AW2 are configured not to be electrically connected, if a short circuit occurs inside the motor but the circuits are electrically independent from each other, the normal inverter and the armature circuit generate torque and thus, influence of the short-circuit can be reduced. In addition, FIG. 7 illustrates an example in which a motor relay is not provided, but the motor relay may be provided. When a motor relay is provided, the motor relay is opened in a malfunction situation and thus, it is possible to take a measure of making braking torque small.

FIG. 4 illustrates an example of a Y wire connection, but the present invention is not limited to the wire connection. FIG. 5 illustrates an example of a Δ wire connection. U1+ and W1− are connected to form an A1 phase winding, V1+ and U1− are connected to form a B1 phase winding, and W1+ and V1− are connected to form a C1 phase winding. Furthermore, U2+ and W2− are connected to form an A2 phase winding, V2+ and U2− are connected to form a B2 phase winding, and W2+ and V2− are connected to form a C2 phase winding.

When the windings are connected to the two inverters Inv1 and Inv2, in FIG. 7, a current is supplied to the A1 phase winding of the motor from between the MOS-FET11 and the MOS-FET12 via a connection conductor such as a bus bar, a current is supplied to the B1 phase winding of the motor from between the MOS-FET13 and the MOS-FET14 via a connection conductor such as a bus bar and a current is supplied to the C1 phase winding of the motor from between the MOS-FET15 and the MOS-FET16 via a connection conductor such as a bus bar.

In a configuration in which a current is supplied to the A2 phase winding of the motor from between the MOS-FET21 and the MOS-FET22 via a connection conductor such as a bus bar, a current is supplied to the B2 phase winding of the motor from between the MOS-FET23 and the MOS-FET24 via a connection conductor such as a bus bar and a current is supplied to the C2 phase winding of the motor from between the MOS-FET25 and the MOS-FET26 via a connection conductor such as a bus bar, the same effects are obtained.

Furthermore, when the Δ wire connection is carried out, since an induced voltage of the coil becomes √3 times that of the coil when the Y wire connection is carried out, the number of windings can be approximately √3 times greater than that of the Y wire connection. Accordingly, it is possible to make the wire diameter of the coil small and thus, machinability is improved. At the same time, a winding space factor is improved and thus, a copper loss can be reduced and high efficiency is obtained.

In addition, the motor M has the armature winding AW being wound in a concentrated manner around the teeth T1 to T18 which is, so-called, a concentrated winding. The motor M has small coil ends and is small in size, a copper loss is small and thus, high efficiency is obtained.

In the embodiment, an example is illustrated in which the number of poles is 14 and the number of teeth is 18, but even in a permanent magnet type motor having an integer multiple of the number of poles and an integer multiple of the number of slots, the same effects are obtained. In particular, when the number of poles is 14n and the number of teeth is 18n (n is an integer and n≥2), since a spatial order of an electromagnetic excitation force is improved by n times, vibration and noise are further reduced.

In this case, when the number of poles is M and the number of teeth is N, it is possible to express M=14n and N=18n (n is an integer and n is 1 or greater). At this time, a wire connection of the armature winding AW can be repeated n times the wire connection of the configuration in FIG. 3. In the configuration of FIG. 3, since the armature winding AW has the two armature windings AW1 and AW2 that form parallel circuits, the armature winding AW can configure the maximum 2n number of parallel circuits of the armature windings. In other words, the number of parallel circuits to be obtained can be a divisor of 2n. In order to connect the armature winding AW to the two inverters Inv1 and Inv2, it is necessary to divide the armature winding AW into the two sets of armature windings AW1 and AW2, and the number of parallel circuits is required to be an even number. Furthermore, in each of the parallel circuits, a 1-phase armature circuit is preferably configured to have a 6n/m number of coils (coils that are wound in a concentrated manner around the teeth) connected in series with each other.

Accordingly, when the motor has a configuration in which the rotor Rr has magnetic poles that are configured to have the magnetized permanent magnets PM, the number of magnetic poles is M, the stator has teeth T around which coils are wound in a concentrated manner and which are circumferentially arranged at equal intervals, the number of teeth T is N, the number of poles M is equal to 14n, the number of teeth N is equal to 18n (n is an integer and n≥1), the armature winding AW is configured to have an m number of parallel circuits (m is an even number that is 2 or greater, and is a divisor of 2n), a 1-phase armature winding circuit of the parallel circuit is configured to have a 6n/m number of coils connected in series with each other, and since the motor has a concentrated winding, the high-efficiency motor with a small size is obtained and a torque ripple also is small. Furthermore, since the second-spatial order electromagnetic excitation force is small, low vibration and low noise are obtained. When the armature winding AW is formed by the armature windings that form parallel circuits, since it is possible to make a winding thin, a winding space factor is improved and machinability also is improved.

When n is 1, that is, M is 14 and N is 18, the number of poles is the smallest, and in angle error of a rotary angle sensor, a mechanical angle and an electrical angle have a relationship of (mechanical angle)=(the number of poles)×(mechanical angle). Accordingly, when n is 1, an angle error that is converted into an electrical angle of the rotary sensor becomes small. Accordingly, the motor is unlikely to be affected by an angle error of the rotary sensor such as a resolver sensor, a GMR sensor, or an MR sensor, a torque ripple becomes small, the motor with low vibration and low noise is obtained.

In addition, with regard to a positional relationship of the coils, when n is equal to or greater than 2, since the wire connection in FIG. 3 is repeated in n times, out of the 18n number of teeth of the stator core SC, coils that are wound around eighteen teeth consecutively from an 18 (n−1)+1-th tooth to an 18(n−1)+18-th tooth may be set to be coils U11, V11, V12, W11, U12, U13, V13, W12, W13, U21, V21, V22, W21, U22, U23, V23, W22 and W23, respectively.

In Embodiment 1, the permanent magnet type concentrated winding motor is described in which the permanent magnets PM1 to PM14 are arranged on the surface of the rotor core RC of the rotor Rr. In the permanent magnet type concentrated winding motor having the structure, cogging torque and a torque ripple are small. Since gaps are present which are equivalent to the thicknesses of the permanent magnets PM1 to PM14 in a radial direction of the rotor, even though an eccentricity occurs between the rotor Rr and the stator Sr, an electromagnetic force is small, and vibration and noise are small.

Embodiment 2

Figure 9:
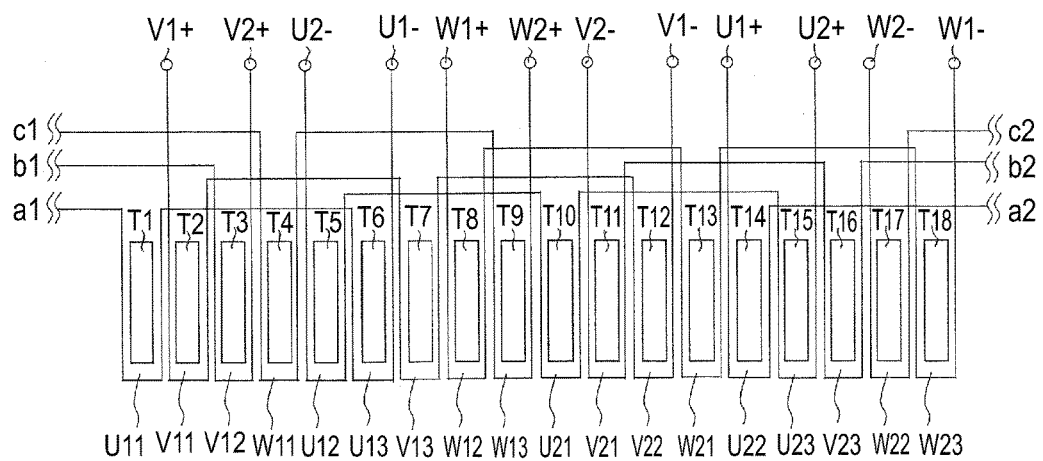
FIG. 9 is a view illustrating Embodiment 2 according to the present invention, and is a view describing a wire connection of an armature winding.

With regard to a wire connection of an armature winding, the example in FIG. 3 is described in Embodiment 1, but in Embodiment 2, another example will be described. FIG. 9 is a view describing a wire connection of an armature winding. FIG. 9 is a view illustrating how the eighteen coils illustrated in FIGS. 1 and 2 are electrically connected with each other.

In FIG. 9, eighteen rectangles in a row indicate the teeth T1 to T18 from a first tooth to an eighteenth tooth, and the coils wound around the teeth T1 to T18 are indicated by the coils U11, V11, V12, W11, U12, U13, V13, W12, W13, U21, V21, V22, W21, U22, U23, V23, W22 and W23, respectively. a1 and a2 are not illustrated, but are electrically and continuously connected. Similarly, b1 and b2 also are electrically and continuously connected, and c1 and c2 also are electrically and continuously connected.

The coils U22, U11 and U13 are connected in series with each other, and configure the U1 phase winding which is the first U-phase winding. At this time, the coils U22, U11 and U13 have the same coil winding direction.

The coils V11, V13 and V22 are connected in series with each other, and configure the V1 phase winding which is the first V-phase winding. At this time, the coils V11, V13 and V22 have the same coil winding direction.

The coils W12, W21 and W23 are connected in series with each other, and configure the W1 phase winding which is the first W-phase winding. At this time, the coils W12, W21 and W23 have the same coil winding direction.

The coils U23, U21 and U12 are connected in series with each other, and configure the U2 phase winding which is the second U-phase winding. At this time, the coils U23, U21 and U12 have the same coil winding direction.

The coils V12, V23 and V21 are connected in series with each other, and configure the V2 phase winding which is the second V-phase winding. At this time, the coils V12, V23 and V21 have the same coil winding direction.

The coils W13, W11 and W22 are connected in series with each other, and configure the W2 phase winding which is the second W-phase winding. At this time, the coils W13, W11 and W22 have the same coil winding direction.

In addition, both ends of the U1 phase winding have U1+ on a side of the coil U22, and U1− on the side of the coil U13. Similarly, both ends of the U2 phase winding have U2+ on the side of the coil U23, and U2− on a side of the coil U12. Similarly, both ends of the V1 phase winding have V1+ on the side of the coil V11, and V1− on a side of the coil V22. Similarly, both ends of the V2 phase winding have V2+ on the side of the coil V12, and V2− on the side of the coil V21. Similarly, both ends of the W1 phase winding have W1+ on a side of the coil W12, and W1− on the side of the coil W23. Similarly, both ends of the W2 phase winding have W2+ on the side of the coil W13, and W2− on a side of the coil W22.

Figure 10:
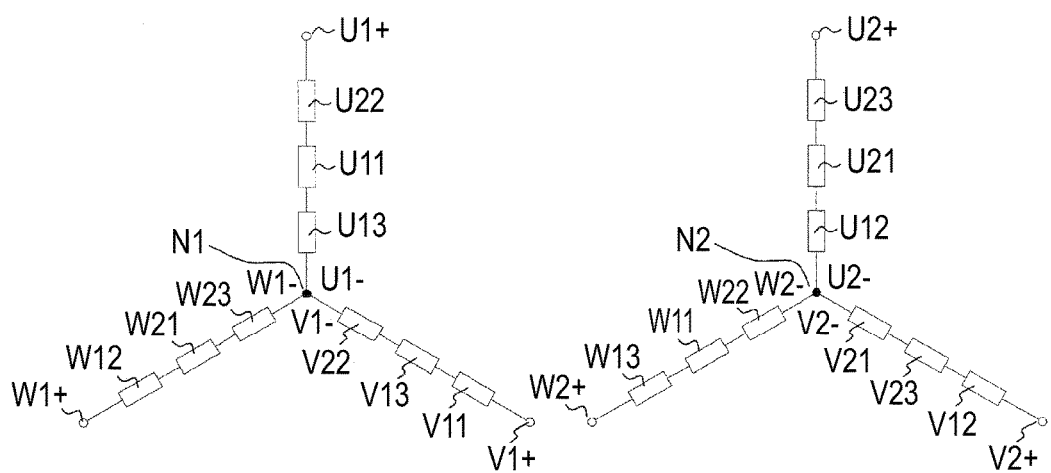
FIG. 10 is a view illustrating Embodiment 2 according to the present invention, and is a view describing a Y wire connection of the armature winding.

FIG. 10 is a view describing a Y wire connection of the U1, U2, V1, V2, W1 and W2 phase windings in FIG. 9. In a left side view of FIG. 10, U1−, V1− and W1− are electrically connected with each other by a Y wire connection having N1 as a neutral point. In contrast, in a right side view of FIG. 10, U2−, V2− and W2− are electrically connected with each other by a Y wire connection having N2 as a neutral point.

Figure 11:
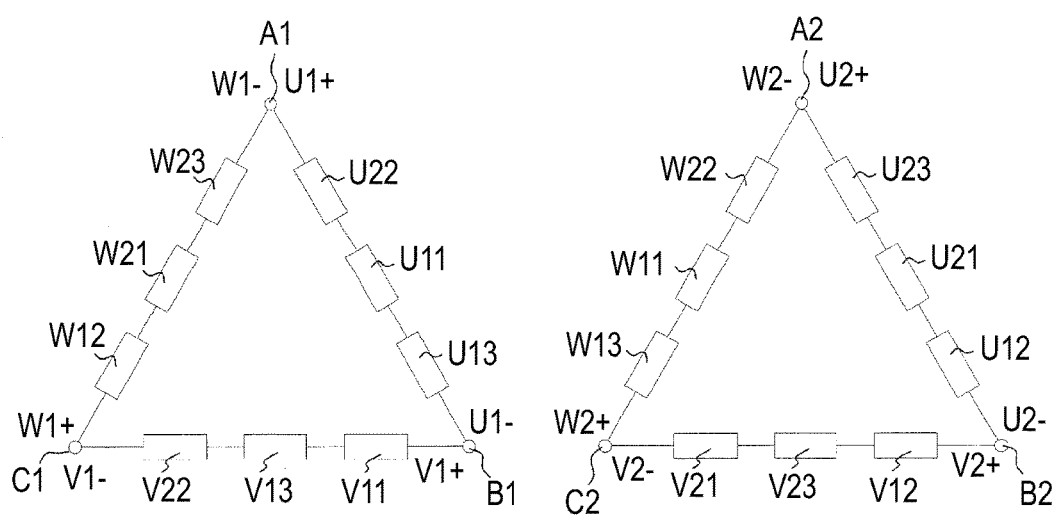
FIG. 11 is a view illustrating Embodiment 2 according to the present invention, and is a view describing a Δ wire connection of the armature winding.

FIG. 11 illustrates an example of a Δ wire connection. U1+ and W1− are connected to form the A1 phase winding, V1+ and U1− are connected to form the B1 phase winding, and W1+ and V1− are connected to form the C1 phase winding. Furthermore, U2+ and W2− are connected to form the A2 phase winding, V2+ and U2− are connected to form the B2 phase winding, and W2+ and V2− are connected to form the C2 phase winding.

Even in a case where a wire connection is carried out in this way, the same effects as those of Embodiment 1 are obtained. It is possible to greatly reduce the second-spatial order electromagnetic excitation force as illustrated in FIG. 6B. Like for the coils U22, U11 and U13 or the coils U23, U21 and U12 as illustrated in FIG. 9, the reason is because the three coils dispersedly arranged within a mechanical angle of 200 degrees are connected in series with each other, and because the U1 and U2 phase windings are arranged at positions offset from each other at a mechanical angle of 180 degrees. Since the V1, V2, W1 and W2 phase windings also have the same coil connection and coil arrangement, it is possible to make the second-spatial order electromagnetic excitation force small.

Furthermore, in a case where the motor is driven by the two inverters Inv1 and Inv2 as illustrated in FIG. 7, similar to in Embodiment 1, when phases of currents supplied to the armature windings to which the two inverters Inv1 and Inv2 correspond, respectively, are changed relative to each other, it is possible to greatly reduce a torque ripple. For example, when the phases of the currents of the two inverters Inv1 and Inv2 are offset relative to each other at an electrical angle of 30 degrees, the sixth-order torque ripples cancel each other out, the sixth-order torque ripple is reduced as indicated by the solid line in FIG. 8, and the p-p value of the torque ripple is greatly reduced.

A torque ripple is a root cause of vibration and noise in an electric power steering apparatus. In addition, a driver may feel the torque ripple and a steering feeling deteriorates. However, since it is possible to greatly reduce a torque ripple according to Embodiment 2, vibration and noise are small, and a good steering feeling can be obtained.

A positional relationship between three coils connected in series is a difference between the wire connection in FIG. 9 according to Embodiment 2 and the wire connections in FIGS. 3, 4 and 5 according to Embodiment 1. In the wire connection in FIG. 3, each of three coils connected in series is positioned at 0 degrees, 80 degrees and 100 degrees, and the coils within a range of 0 degrees to 100 degrees are connected in series with each other. In contrast, in the example in FIG. 9, each of three coils connected in series is positioned at 0 degrees, 100 degrees and 200 degrees, and the coils within a range of 0 degrees to 200 degrees are connected in series with each other. In this configuration, when a U1 phase and a U2 phase current are unbalanced, an electromagnetic force becomes small compared to that in the example of FIG. 3. Accordingly, vibration and noise occurring from various variations can be reduced. Even in a case where the two inverters tentatively malfunction, an unbalanced electromagnetic force becomes small and thus, small vibration can be obtained.

Other than the wire connection in FIG. 3, the same effects are obtained even with the following wire connection.

The coils U23, U11 and U12 are connected in series with each other, and configure the U1 phase winding which is the first U-phase winding. In this configuration, the coil U11 has a coil winding direction opposite to that of the coils U23 and U12.

The coils V12, V13 and V21 are connected in series with each other, and configure the V1 phase winding which is the first V-phase winding. In this configuration, the coil V13 has a coil winding direction opposite to that of the coils V12 and V21.

The coils W13, W21 and W22 are connected in series with each other, and configure the W1 phase winding which is the first W-phase winding. In this configuration, the coil W21 has a coil winding direction opposite to that of the coils W13 and W22.

The coils U22, U21 and U13 are connected in series with each other, and configure the U2 phase winding which is the second U-phase winding. In this configuration, the coil U21 has a coil winding direction opposite to that of the coils U22 and U13.

The coils V22, V23 and V11 are connected in series with each other, and configure the V2 phase winding which is the second V-phase winding. In this configuration, the coil V23 has a coil winding direction opposite to that of the coils V22 and V11.

The coils W23, W11 and W12 are connected in series with each other, and configure the W2 phase winding which is the second W-phase winding. In this configuration, the coil W11 has a coil winding direction opposite to that of the coils W23 and W12.

In the aforementioned configuration, the same effects described in Embodiment Tare obtained. As illustrated in FIG. 6B, the second-spatial order electromagnetic excitation force can be greatly reduced. Like for the coils U23, U11 and U12 or the coils U22, U21 and U13, the reason is because the three coils dispersedly arranged within a mechanical angle of 160 degrees are connected in series with each other, and because the U1 and U2 phase windings are arranged at positions offset from each other at a mechanical angle of 180 degrees. Since the V1, V2, W1 and W2 phase windings also have the same coil connection and coil arrangement, it is possible to make the second-spatial order electromagnetic excitation force small. A Y wire connection may be carried out or a Δ wire connection may be carried out. At this time, since coils within a mechanical angle of a range of 0 degrees to 160 degrees are connected in series with each other, when a U1 phase and a U2 phase current are unbalanced, an electromagnetic force becomes small compared to that in the example of FIG. 3.

Embodiment 3

Embodiments 1 and 2 illustrate an example in which a permanent magnet type concentrated winding motor is driven by two inverters, but Embodiment 3 illustrates an example in which a permanent magnet type concentrated winding motor is driven by one inverter.

Figure 12:
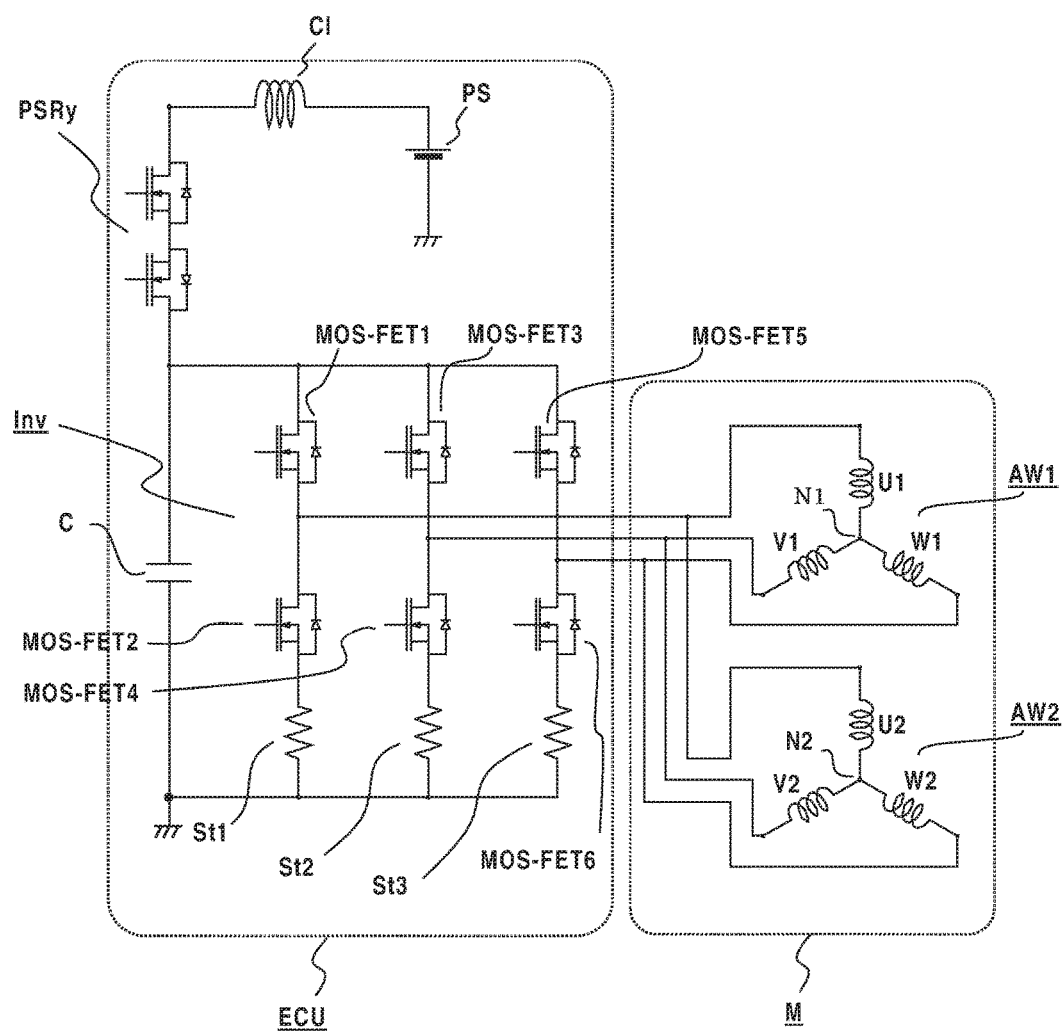
FIG. 12 is a view illustrating Embodiment 3 according to the present invention, and is a view describing a circuit of an inverter.

FIG. 12 is a view describing a circuit of the motor M and the electronic control unit ECU according to Embodiment 3. The motor M is a permanent magnet type concentrated winding motor in which the number of poles is 14 and the number of slots is 18, and which is illustrated in FIGS. 1 to 5. For simplification purposes, in FIG. 12, except for a structure, coils and a wire connection, details are not illustrated and only an armature winding is illustrated.

The armature winding AW of the motor M is configured to have the armature winding AW1 formed by the first U-phase winding U1, the first V-phase winding V1 and the first W-phase winding W1, and the armature winding AW2 formed by the second U-phase winding U2, the second V-phase winding V2 and the second W-phase winding W2.

For simplification purposes, details of the electronic control unit (ECU) are also omitted, and only a power circuit portion of the inverter Inv is illustrated. The electronic control unit (ECU) is configured to have one inverter circuit, and the inverter supplies a 3-phase current to the two armature windings AW1 and AW2 which form parallel circuits. A direct current is supplied to the electronic control unit (ECU) from the power supply PS such as a battery, and the power supply relay PSRy is connected to the inverter via the coil C1 for noise removal.

In FIG. 12, the power supply PS is illustrated as being inside the electronic control unit (ECU), but in practicality, electrical power is supplied from an external power supply such as a battery via a connector. The one power supply relay PSRy is provided and is configured to have two MOS-FETs, and in a malfunction situation or the like, the power supply relay PSRy is opened and an overcurrent is prevented from flowing.

In FIG. 12, the power supply PS, the coil C1 and the power supply relay PSRy are connected in the sequence listed, but the power supply relay PSRy may be provided at a position closer to the power supply PS than the coil C1.

A capacitor C is a smoothing capacitor. In FIG. 12, the electronic control unit ECU is configured to have the one capacitor, but may be configured to have a plurality of capacitors connected in parallel with each other.

The inverter Inv is configured to have a bridge using six MOS-FETs. In the inverter Inv, a MOS-FET1 and a MOS-FET2 are connected in series with each other, a MOS-FET3 and a MOS-FET4 are connected in series with each other, and a MOS-FET5 and a MOS-FET6 are connected in series with each other, and three pairs of MOS-FETs are connected in parallel with each other.

Furthermore, a shunt resistor is connected to each of ground (GND) sides of the three MOS-FET2, MOS-FET4 and MOS-FET6 on a lower side, and the shunt resistors are indicated by a shunt resistor St1, a shunt resistor St2 and a shunt resistor St3, respectively. The shunt resistors St1, St2 and St3 are used to detect a current value.

The example illustrates a case where three shunt resistors are configured, but two shunt resistors may be configured. Since it is possible to detect a current with only one shunt resistor, one shunt resistor may be configured.

As illustrated in FIG. 12, a current is supplied to the U1 phase and the U2 phase windings of the motor M from between the MOS-FET1 and the MOS-FET2 via a connection conductor such as a bus bar, a current is supplied to the V1 phase and the V2 phase windings of the motor M from between the MOS-FET3 and the MOS-FET4 via a connection conductor such as a bus bar and a current is supplied to the W1 phase and the W2 phase windings of the motor M from between the MOS-FET5 and the MOS-FET6 via a connection conductor such as a bus bar.

Electrical connections between the motor M and the electronic control unit ECU are carried out in three phases and at a total of three locations, but the electrical connections are divided into the armature windings AW1 and AW2 inside the motor M. In wire connections of the armature windings AW1 and AW2, each of the coils in FIG. 3 may be carried out by the Y wire connection illustrated in FIG. 4, and each of the coils in FIG. 3 may be carried out by the Δ wire connection illustrated in FIG. 5.

The Y wire connection has the two neutral points N1 and N2, but the neutral points N1 and N2 may or may not be electrically connected. In a case where the neutral points N1 and N2 are electrically connected, when a short-circuit malfunction of the motor occurs, the motor circuit can be opened with the one relay by providing only one relay at the neutral point. In a case where the neutral points N1 and N2 are not electrically connected and a relay is provided at each of the neutral points N1 and N2, only one relay of an armature winding experiencing a short-circuit malfunction is opened, the other relay is set to be ON and thus, the motor can be driven. That is, this means that, even when a short-circuit malfunction occurs in an electric power steering apparatus, the motor can generate assist torque.

In addition, when a wire connection is carried out as illustrated in FIG. 3, other effects are obtained. In FIG. 3, the U1 phase winding is configured to have the coils U11, U12 and U13 connected in series with each other, that is, the first tooth T1, the fifth tooth T5 and the sixth tooth T6 connected in series with each other. The first tooth T1 and the sixth tooth T6 are positionally separated from each other at a mechanical angle of 100 degrees, and the coils of each of the U2, V1, V2, W1 and W2 phase windings also are connected in series with each other at teeth within a mechanical angle of 100 degrees. As such, since the coils at mechanically close positions are connected in series with each other, a wire connection is easily carried out.

The wire connection in FIG. 9 may be carried out by the Y wire connection illustrated in FIG. 10, and may be carried out by the Δ wire connection illustrated in FIG. 11. In this case, as being apparent from FIG. 9, each of coils is positioned at 0 degrees, 100 degrees and 200 degrees, and the coils within a range of 0 degrees to 200 degrees are connected in series with each other. In this configuration, when a U1 phase and a U2 phase current are unbalanced, an electromagnetic force becomes small compared to that in the example of FIG. 3. Accordingly, vibration and noise occurring from various variations can be reduced. Even in a case where unbalance between the two armature windings AW1 and AW2 occurs, an unbalanced electromagnetic force becomes small and thus, small vibration can be obtained.

In addition, when the coils U23, U11 and U12 are connected in series with each other, and configure the U1 phase winding which is the first U-phase winding as described in the latter half of Embodiment 2, even in a case where the coil U11 has a coil winding direction opposite to that of the coils U23 and U12 (descriptions of the coils U2, V1, V2, W1 and W2 are omitted), the same effects are obtained.

In addition, in a motor used in an electric power steering apparatus, a 12 V power supply voltage system is largely used, and there is a case where a phase current of the motor exceeds 80 Arms, the number of parallel circuits is small, and the wire diameter of a coil becomes great. Accordingly, when coils are concentrated around teeth, machinability greatly worsens. However, in the configuration according to Embodiment 3, since the armature winding AW is configured to have the two parallel circuits AW1 and AW2, it is possible to make the wire diameter of a coil small compared to when one armature winding is configured. For example, in a motor in which a stator core has a diameter of 80 mm to 90 mm, since a coil of the diameter of approximately 1 mm can be used, workability of winding is improved, and the configuration is suitable for mass production.

In addition, even in the motor according to the embodiment, the same effects of reducing an electromagnetic excitation force as in FIG. 6B can be obtained. According to FIG. 6B, compared to in a motor in the related art, the second order that is a low order is greatly reduced. The second-spatial order electromagnetic excitation force is greatly reduced.

Furthermore, when the motor M is driven by the one inverter Inv, since the numbers of the MOS-FETs, the smoothing capacitors and the shunt resistors are small compared to in the configuration in FIG. 7, it is possible to build a low-vibration and low-noise motor drive apparatus at low costs.

Embodiment 4

Figure 13:
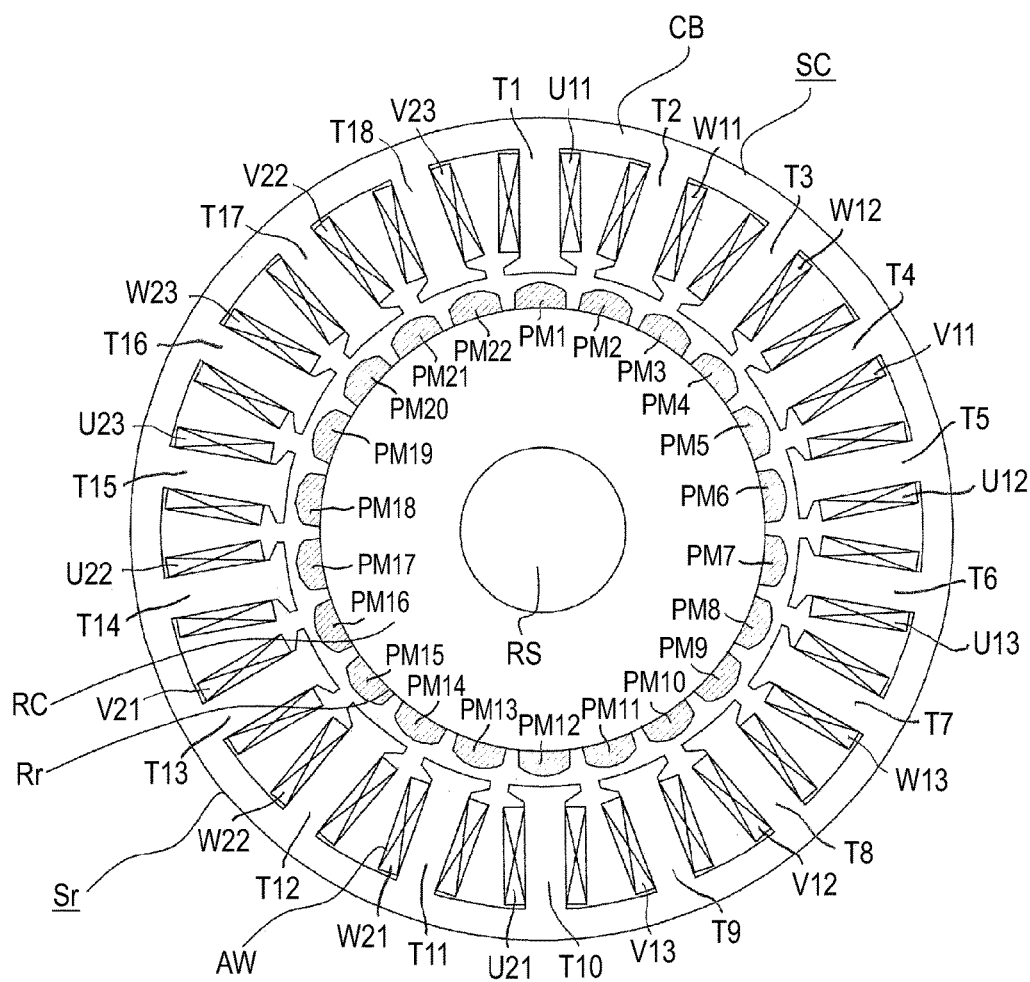
FIG. 13 is a view illustrating Embodiment 4 according to the present invention, and is an example of a vertical cross-sectional front view of a surface permanent magnet type motor with twenty two poles.

FIG. 13 is a cross-sectional view of the permanent magnet type concentrated winding motor according to Embodiment 4. The motor M is a motor in which the number of poles of the rotor Rr is 22, the number of slots of the stator Sr is 18 and the rotor Rr is rotatably provided inside the stator. The rotor Rr has the shaft RS that is a rotary shaft, and the rotor core RC provided outside the shaft RS. Furthermore, the twenty-two magnetic poles PM1 to PM22 of the permanent magnet are bonded to the circumferential side of the rotor core RC at circumferentially equal intervals.

A cover is not illustrated in FIG. 13, but there is a case where a cylindrical cover made of a nonmagnetic material such as stainless steel or aluminum for protection of the magnet and prevention of spattering is provided outside the permanent magnet.

In addition, in FIG. 13, for convenience, a numeral is assigned to each armature winding (coil) being wound in a concentrated manner around each of the teeth T1 to T18 so as to illustrate which one of U-, V- and W-phase coils each coil indicates. The U-phase coils are configured to have six coils U11, U12, U13, U21, U22 and U23, the V-phase coils are configured to have six coils V11, V12, V13, V21, V22 and V23 and the W-phase coils are configured to have six coils W11, W12, W13, W21, W22 and W23. As illustrated in FIG. 13, the coils U11, W11, W12, V11, U12, U13, W13, V12, V13, U21, W21, W22, V21, U22, U23, W23, V22 and V23 are arranged sequentially in a row to correspond to the teeth T1 to T18, respectively. Subsequently, away that the eighteen coils U11, W11, W12, V11, U12, U13, W13, V12, V13, U21, W21, W22, V21, U22, U23, W23, V22 and V23 are connected with each other will be described later in detail.

Figure 14:
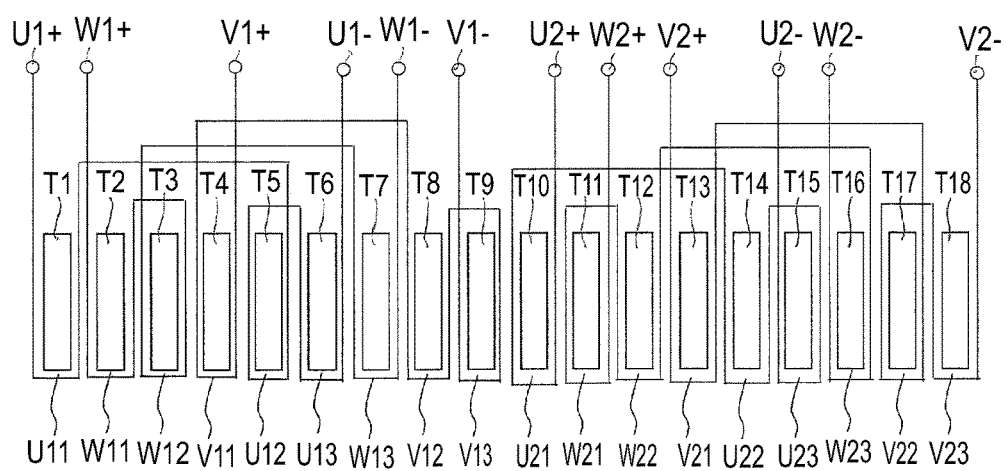
FIG. 14 is a view illustrating Embodiment 4 according to the present invention, and is a view describing a wire connection of an armature winding of the twenty two-pole motor.

FIG. 14 is a view describing a wire connection of the armature winding, and a view illustrating how the eighteen coils are electrically connected with each other. Eighteen rectangles in a row indicate the teeth T1 to T18 from a first tooth to an eighteen tooth, and the coils wound around the teeth T1 to T18 are indicated by the coils U11, W11, W12, V11, U12, U13, W13, V12, V13, U21, W21, W22, V21, U22, U23, W23, V22 and V23.

The coils U11, U12 and U13 are connected in series with each other, and configure the U1 phase winding which is the first U-phase winding. At this time, the coil U12 has a coil winding direction opposite to that of the coils U11 and U13.

In addition, the coils U21, U22 and U23 are connected in series with each other, and configure the U2 phase winding which is the second U-phase winding. At this time, the coil U22 has a coil winding direction opposite to that of the coils U21 and U23.

The coils V11, V12 and V13 are connected in series with each other, and configure the V1 phase winding which is the first V-phase winding. At this time, the coil V12 has a coil winding direction opposite to that of the coils V11 and V13.

In addition, the coils V21, V22 and V23 are connected in series with each other, and configure the V2 phase winding which is the second V-phase winding. At this time, the coil V22 has a coil winding direction opposite to that of the coils V21 and V23.

The coils W11, W12 and W13 are connected in series with each other, and configure the W1 phase winding which is the first W-phase winding. At this time, the coil W12 has a coil winding direction opposite to that of the coils W11 and W13.

In addition, the coils W21, W22 and W23 are connected in series with each other, and configure the W2 phase winding which is the second W-phase winding. At this time, the coil W22 has a coil winding direction opposite to that of the coils W21 and W23.

In addition, both ends of the U1 phase winding have U1+ on the side of the coil U11, and U1− on the side of the coil U13. Similarly, both ends of the U2 phase winding have U2+ on the side of the coil U21, and U2− on the side of the coil U23. Similarly, both ends of the V1 phase winding have V1+ on the side of the coil V11, and V1− on the side of the coil V13. Similarly, both ends of the V2 phase winding have V2+ on the side of the coil V21, and V2− on the side of the coil V23. Similarly, both ends of the W1 phase winding have W1+ on the side of the coil W11, and W1− on the side of the coil W13. Similarly, both ends of the W2 phase winding have W2+ on the side of the coil W21, and W2− on the side of the coil W23.

When the U1, U2, V1, V2, W1 and W2 phase windings are connected by a Y wire connection in FIG. 14, the wire connection is the same as in FIG. 4. In a left side view of FIG. 4, U1−, V1− and W1− are electrically connected with each other by a Y wire connection having N1 as a neutral point. In contrast, in aright side view of FIG. 4, U2−, V2− and W2− are electrically connected with each other by a Y wire connection having N2 as a neutral point.

Figure 15:
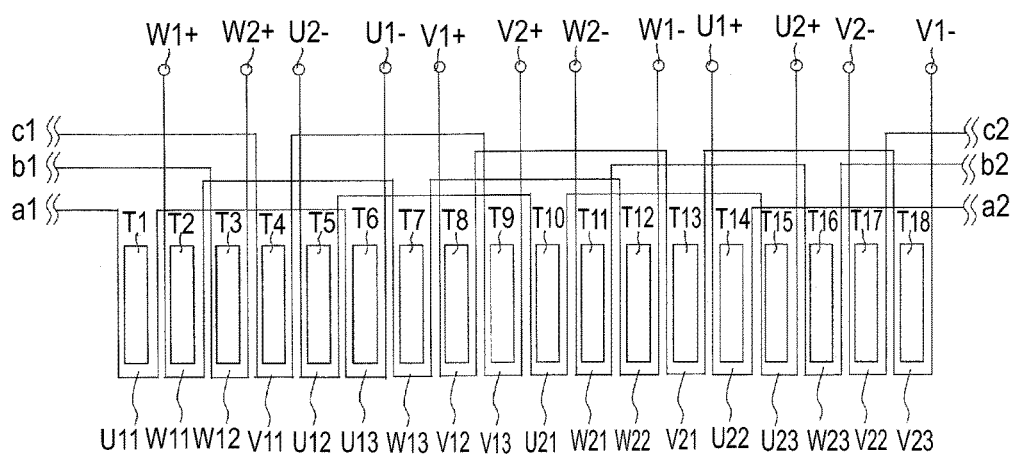
FIG. 15 is a view illustrating Embodiment 4 according to the present invention, and is a view describing another wire connection of the armature winding of the twenty two-pole motor.

FIG. 15 is a view illustrating how the eighteen coils that are exemplified in FIG. 13 are electrically connected with each other.

In FIG. 15, eighteen rectangles in a row indicate the teeth T1 to T18 from a first tooth to an eighteenth tooth, and the coils wound around the teeth T1 to T18 are indicated by the coils U11, W11, W12, V11, U12, U13, W13, V12, V13, U21, W21, W22, V21, U22, U23, W23, V22 and V23, respectively. a1 and a2 are not illustrated, but are electrically and continuously connected. Similarly, b1 and b2 also are electrically and continuously connected, and c1 and c2 also are electrically and continuously connected.

The coils U22, U11 and U13 are connected in series with each other, and configure the U1 phase winding which is the first U-phase winding. At this time, the coils U22, U11 and U13 have the same coil winding direction.

The coils V12, V21 and V23 are connected in series with each other, and configure the V1 phase winding which is the first V-phase winding. At this time, the coils V12, V21 and V23 have the same coil winding direction.

The coils W11, W13 and W22 are connected in series with each other, and configure the W1 phase winding which is the first W-phase winding. At this time, the coils W11, W13 and W22 have the same coil winding direction.

The coils U23, U21 and U12 are connected in series with each other, and configure the U2 phase winding which is the second U-phase winding. At this time, the coils U23, U21 and U12 have the same coil winding direction.

The coils V22, V11 and V13 are connected in series with each other, and configure the V2 phase winding which is the second V-phase winding. At this time, the coils V22, V11 and V13 have the same coil winding direction.

The coils W12, W23 and W21 are connected in series with each other, and configure the W2 phase winding which is the second W-phase winding. At this time, the coils W12, W23 and W21 have the same coil winding direction.

In addition, both ends of the U1 phase winding have U1+ on the side of the coil U22, and U1− on the side of the coil U13. Similarly, both ends of the U2 phase winding have U2+ on the side of the coil U23, and U2− on the side of the coil U12.

Similarly, both ends of the V1 phase winding have V1+ on the side of the coil V12, and V1− on the side of the coil V23. Similarly, both ends of the V2 phase winding have V2+ on the side of the coil V13, and V2− on the side of the coil V22. Similarly, both ends of the W1 phase winding have W1+ on the side of the coil W11, and W1− on the side of the coil W22. Similarly, both ends of the W2 phase winding have W2+ on the side of the coil W12, and W2− on the side of the coil W21.

The U1, U2, V1, V2, W1 and W2 phase windings in FIGS. 14 and 15 are configured to have a Y wire connection or to have a Δ wire connection.

In the wire connection in FIG. 14, the U1 phase winding is configured to have the coils U11, U12 and U13 connected in series with each other, that is, the coils that are wound around the first tooth T1, the fifth tooth T5 and the sixth tooth T6 connected in series with each other. The first tooth T1 and the sixth tooth T6 are positionally separated from each other at a mechanical angle of 100 degrees, and the coils of each of the U2, V1, V2, W1 and W2 phase windings also are connected in series with each other at teeth within a mechanical angle of 100 degrees. As such, since the coils at mechanically close positions are connected in series with each other, the wire connection is easily carried out.

In a wire connection in FIG. 15 as being apparent from FIG. 13, each of coils is positioned at 0 degrees, 100 degrees and 200 degrees, and the coils within a range of 0 degrees to 200 degrees are connected in series with each other. In this configuration, when a U1 phase and a U2 phase current are unbalanced, an electromagnetic force becomes small compared to that in the example of FIG. 14. Accordingly, vibration and noise occurring from various variations can be reduced. Even in a case where unbalance of the current between the two armature windings AW1 and AW2 occurs, an unbalanced electromagnetic force becomes small and thus, small vibration can be obtained.

As illustrated in FIG. 12, one inverter may be configured or as illustrated in FIG. 7, two inverters may be configured. In this configuration, effects equivalent to those that are illustrated in FIG. 6B, that is, the second-spatial order electromagnetic excitation force, can be reduced. Furthermore, in a case where two inverters are used, when phases of currents that are individually supplied from the two inverters to the armature windings AW1 and AW2, respectively, are offset relative to each other at an electrical angle of degrees, it is also possible to greatly reduce the sixth-order torque ripple.

Similar to in Embodiment 1, in the embodiment, it is possible to generalize the number of poles M and the number of teeth N as M=22n and N=18n (n is an integer and n≥1), respectively. When the number of poles and the number of slots are generalized in accordance with Embodiment 1, it is possible to indicate the number of poles and the number of teeth by M=(18±4)n and N=18n (n is an integer and n≥1), respectively.

Embodiment 5

Figure 16:
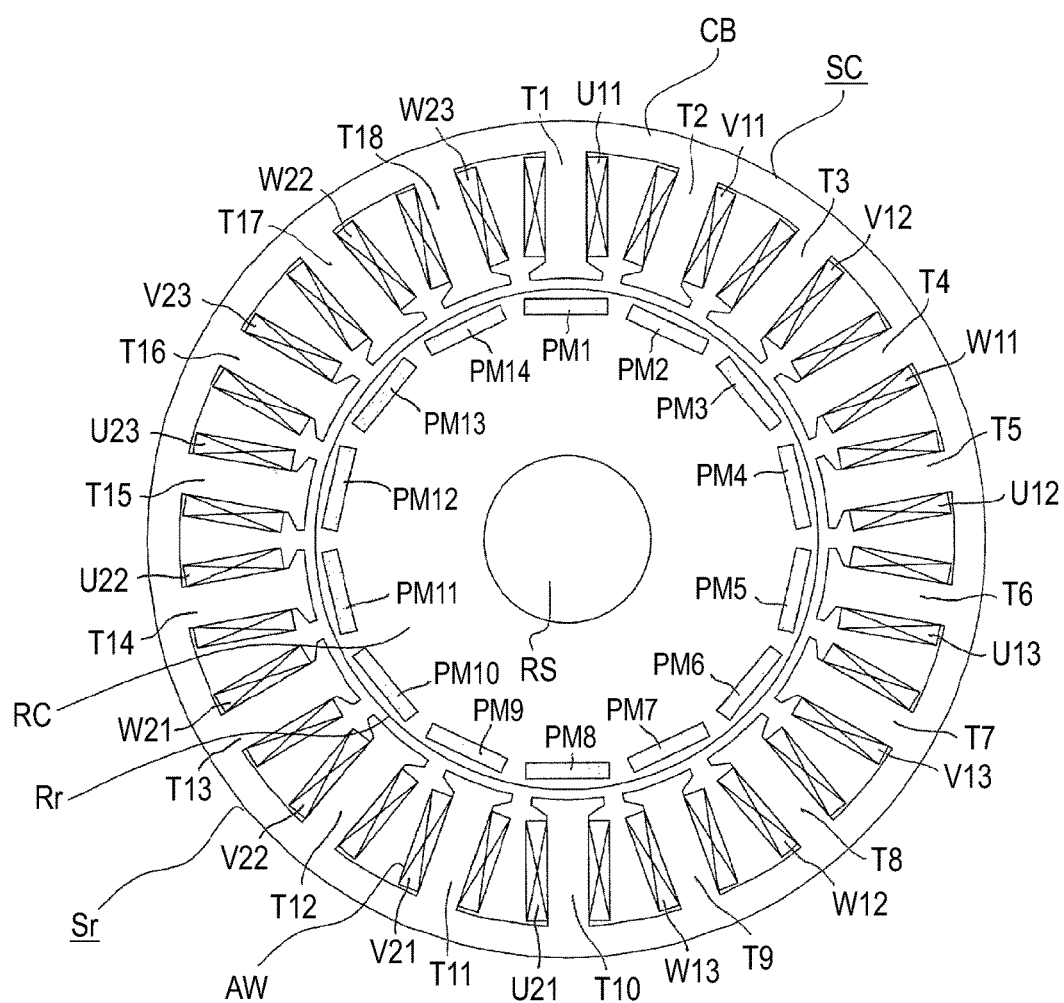
FIG. 16 is a view illustrating Embodiment 5 according to the present invention, and is a vertical cross-sectional front view of a permanent magnet embedded type motor.

Embodiment 1 illustrates an example of a so-called surface magnet type motor in which a permanent magnet is arranged on the surface of the rotor core RC, but the present invention is not limited to the surface magnet type motor. FIG. 16 illustrates a magnet embedded type motor in which the permanent magnets PM1 to PM14 are embedded inside the rotor core RC.

The rotor Rr has the shaft RS that is a rotary shaft, and the rotor core RC provided outside the shaft RS. Furthermore, the fourteen magnetic poles PM1 to PM14 of a permanent magnet having a rectangular cross-section are embedded in the rotor core RC at circumferentially equal intervals. In the magnet embedded type motor compared to in the surface magnet type motor in FIG. 2, typically, there is a problem in that equivalent air gaps are small, an electromagnetic excitation force is great, an unbalanced electromagnetic force also is great due to an eccentricity of the rotor or the like, and vibration and noise become great.

However, when the armature windings are configured as described in Embodiments 1 to 4, since a low-spatial order electromagnetic excitation force can be greatly reduced, low vibration and low noise can be obtained even with the magnet embedded type motor. Furthermore, since it is possible to use the permanent magnet having a rectangular cross-section as illustrated in FIG. 16, it is possible to reduce a processing cost of the permanent magnet, and since it is not necessary to use a metal tube for prevention of spattering of the magnets, it is possible to reduce a cost of the motor.

Embodiment 6

Figure 17:
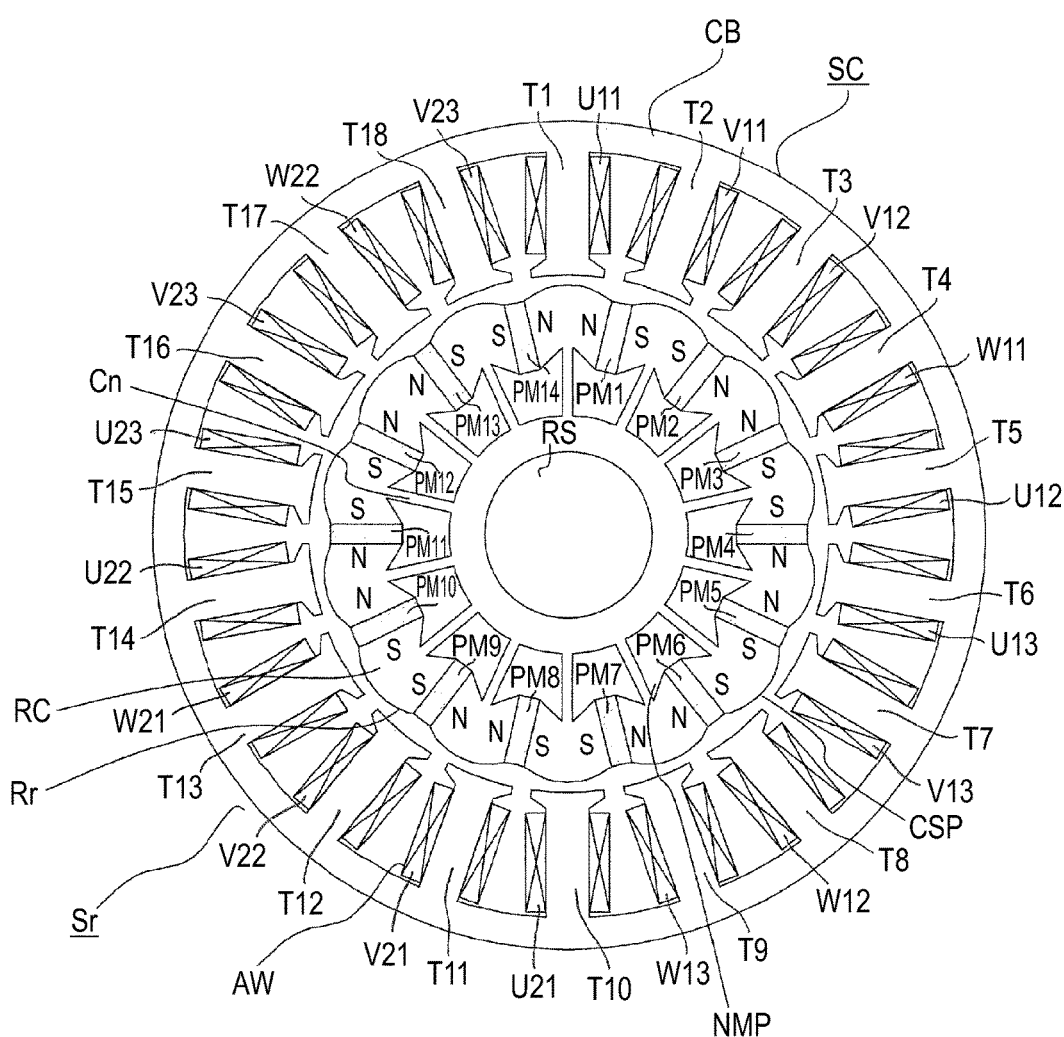
FIG. 17 is a view illustrating Embodiment 6 according to the present invention, and is another example of a vertical cross-sectional front view of the permanent magnet embedded type motor.

FIG. 17 is a view describing a permanent magnet type concentrated winding motor having a structure in which the permanent magnet having a length in a radial direction of the rotor greater than that in a circumferential direction of the rotor is embedded in the rotor core RC.

The stator Sr has the same structure as that in FIG. 2, but the rotor Rr has a different structure. Each of the permanent magnets PM1 to PM14 has a long shape in which the permanent magnet has a length in the radial direction of the rotor greater than that in the circumferential direction of the rotor, and the fourteen permanent magnets PM1 to PM14 are arranged in a row at circumferentially equal intervals.

The permanent magnets are magnetized in a magnetization direction where N and S illustrated in FIG. 17 are set to be an N pole and an S pole, respectively. That is, adjacent permanent magnets are magnetized in such a manner that facing surfaces of the adjacent permanent magnets have the same polarity. When the permanent magnets have the magnetization direction, a magnetic flux is concentrated on the rotor core, and magnetic flux density is increased.

In addition, the rotor core RC is interposed between adjacent permanent magnets. The rotor core RC has a curved surface portion CSP that is a surface facing a side of the stator Sr, and the curved surface has a convex shape in such a manner that a void between the curved surface and the stator Sr has a small length at a midpoint between the adjacent permanent magnets. In this shape, since it is possible to smoothen a waveform of magnetic flux density occurring in the void, it is possible to make cogging torque or a torque ripple small.

Furthermore, a nonmagnetic portion NMP is provided to be in contact with an end surface on aside of an inner diameter of the permanent magnet. The nonmagnetic portion NMP may be air or may be filled with a resin, and a nonmagnetic metal such as stainless steel or aluminum may be inserted into the nonmagnetic portion NMP. In this configuration, it is possible to reduce a leakage flux of the permanent magnet.

A connection portion Cn is provided between the rotor core RC between adjacent permanent magnets and the rotor core RC that is provided to surround a circumference of the shaft RS. The connection portion Cn serves to mechanically connect the rotor core RC between the adjacent permanent magnets to the rotor core RC that is provided to surround the circumference of the shaft RS.

Since the permanent magnet has the radial length greater than the circumferential length, a magnetic flux can be concentrated on the rotor core RC and thus, high torque is obtained. In the structure in which the permanent magnet is embedded in the rotor core RC, there is a problem in that an electromagnetic excitation force becomes great compared to in the surface magnet type motor and vibration and noise become great. However, when a wire connection of the armature winding AW has the same configuration as those (FIGS. 3 to 5 and FIGS. 9 to 11) described in Embodiments 1 and 2, it is possible to make the second-spatial order electromagnetic excitation force small, and low vibration and low noise are obtained. That is, it is possible to achieve both high torque, and low vibration and low noise.

Figure 18:
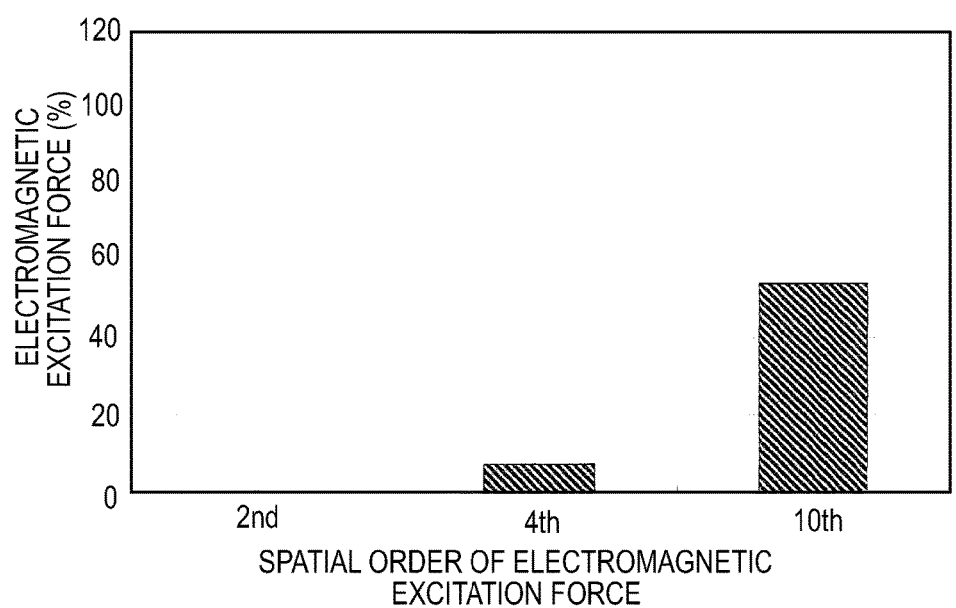
FIG. 18 is a view describing an example of an electromagnetic excitation force of the motor in Embodiment 6 according to the present invention.

FIG. 18 illustrates an electromagnetic excitation force when the motor has the same configuration as in FIG. 17. All of the second-spatial order, the fourth-spatial order and the fourteenth-spatial order electromagnetic excitation forces are further reduced compared to those in FIG. 6B according to Embodiment 1. In particular, since the second-spatial order electromagnetic excitation force is reduced, vibration and noise are further reduced. The synergistic effects are obtained as a combination of the effects obtained when the rotor has the same configuration as that in FIG. 17 and the effects obtained when the armature winding AW has the same configuration as those described in Embodiments 1 and 2.

Embodiment 7

Figure 19:
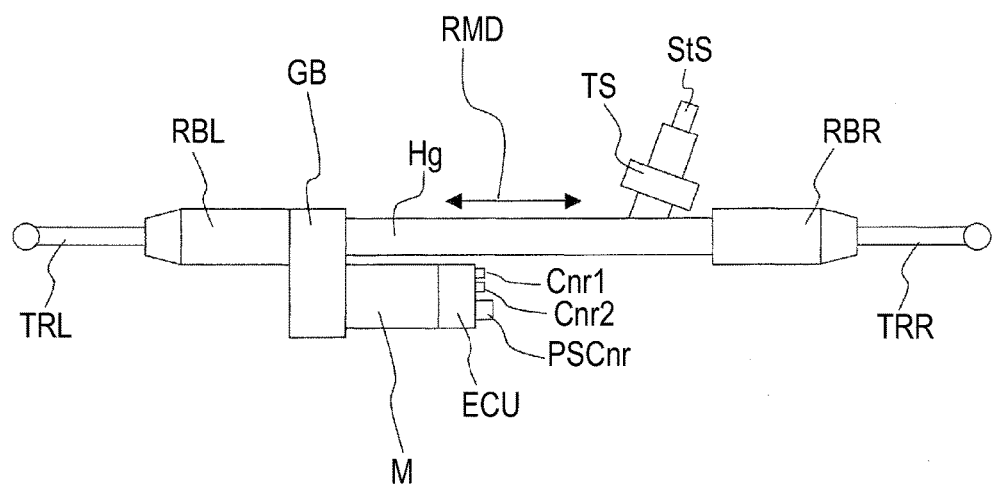
FIG. 19 is a view illustrating Embodiment 7 according to the present invention, and is an exterior view illustrating an example of configuration of an electric power steering apparatus.

FIG. 19 is a view illustrating an electric power steering apparatus for a vehicle. A driver steers a steering wheel (not illustrated), and torque is transmitted to a shaft StS via a steering shaft (not illustrated). At this time, the torque detected by a torque sensor TS is converted into an electrical signal and the converted electrical signal is transmitted to the control unit (ECU) via a cable (not illustrated) and a connector Cnr1. In contrast, vehicle information such as a vehicle speed is converted into an electrical signal and the converted electrical signal is transmitted to the ECU via a connector Cnr2. The ECU calculates necessary assist torque based on the vehicle information such as the torque and the vehicle speed, and supplies a current to the permanent magnet type concentrated winding motor M via the inverter.

The motor M is arranged in parallel with a movement direction (indicated by arrow RMD) of a rack shaft. In addition, electrical power is supplied to the ECU from a battery or an alternator via a power supply connector PSCnr. Torque generated by the permanent magnet type motor M is reduced by a gear box GB that has a belt (not illustrated) and a ball screw (not illustrated) built therein, a driving force is generated to move the rack shaft (not illustrated) in a housing Hg in an arrow direction, and to assist steering effort of the driver. Accordingly, tie rods TRR and TRL are moved, tires are turned, and a vehicle can be turned. When the driver is assisted by torque of the permanent magnet type concentrated winding motor M, it is possible to turn the vehicle with little steering effort.

Rack boots RBR and RBL are provided to prevent foreign substances from entering the apparatus.

In the electric power steering apparatus, since cogging torque or a torque ripple generated by the motor M is transmitted to the driver via a gear, the cogging torque or the torque ripple is desirably small to obtain a good steering feeling. In addition, when the motor M is operated, vibration and noise also are desirably small.

When all of the configurations that are described in Embodiments 1 to 6 are applied to the motor M, the effects in each of Embodiments 1 to 6 can be obtained. In particular, it is possible to make the second-spatial order electromagnetic excitation force small, and low vibration and low noise are obtained. Furthermore, it is possible to achieve both high torque, and low vibration and low noise. As illustrated in FIG. 19, the motor M is arranged in parallel with the movement direction (indicated by arrow RMD) of the rack shaft. The electric power steering apparatus is a system for a large-sized vehicle, but there is a problem in that the electric power steering apparatus is also necessary to have a high-output motor and vibration and noise are also increased due to the high-output motor. However, when Embodiments 1 to 6 are applied to the motor, the problem can be solved, the electric power steering apparatus can be applied even for a large-sized vehicle, and fuel economy can be improved.

In Embodiments 1 to 7 according to the present invention, the rotor has magnetic poles that are configured to have magnetized permanent magnets, the number of magnetic poles is M, the stator has teeth around which coils are wound in a concentrated manner and which are circumferentially arranged at equal intervals, the number of teeth is N, the number of poles M is equal to $(18\pm4)n$ and the number of teeth N is equal to $18n$ (n is an integer and $n \geq 1$), the armature winding formed by the coils is configured to have the m number of 3-phase armature windings that form parallel circuits (m is an even number that is 2 or greater, and is a divisor of 2n), and the 1-phase circuit of each of the 3-phase armature windings that form the parallel circuits is configured to have the 6n/m number of coils connected in series with each other. A high-efficiency motor with a small size is obtained and a torque ripple also is small. Furthermore, since the second-spatial order electromagnetic excitation force is small, low vibration and low noise are obtained. In addition, since it is possible to make a winding thin, a winding space factor is improved and machinability is improved.

In addition, since each of the m number of the 3-phase armature windings that form the parallel circuits is individually fed with electrical power from different inverters, when phases of currents supplied from the two inverters are changed, it is possible to greatly reduce a torque ripple, vibration and noise are small, and a good steering feeling can be obtained.

In addition, since each of the m number of 3-phase armature windings that form the parallel circuits is fed with electrical power from a common inverter, the numbers of the MOS-FETs, the smoothing capacitors and the shunt resistors are small, and it is possible to build a low-vibration and low-noise motor drive apparatus at low costs.

When the number of poles M is equal to 14n and, out of the 18n number of teeth of the stator, coils that are wound around the eighteen teeth consecutively from an 18(n−1)+1-th tooth to an 18(n−1)+18-th tooth are set to be coils U11, V11, V12, W11, U12, U13, V13, W12, W13, U21, V21, V22, W21, U22, U23, V23, W22 and W23, respectively, the coils U11, U12 and U13 are connected in series with each other, and configure a first U-phase winding which is one U-phase 3-phase armature winding that forms the parallel circuits; the coils U21, U22 and U23 are connected in series with each other, and configure a second U-phase winding which is another U-phase 3-phase armature winding that forms the parallel circuits; the coils V11, V12 and V13 are connected in series with each other, and configure a first V-phase winding which is one V-phase 3-phase armature winding that forms the parallel circuits; the coils V21, V22 and V23 are connected in series with each other, and configure a second V-phase winding which is another V-phase 3-phase armature winding that forms the parallel circuits; the coils W11, W12 and W13 are connected in series with each other, and configure a first W-phase winding which is one W-phase 3-phase armature winding that forms the parallel circuits; the coils W21, W22 and W23 are connected in series with each other, and configure a second W-phase winding which is another W-phase 3-phase armature winding that forms the parallel circuits; the first U-phase winding and the second U-phase winding are connected in parallel with each other; the first V-phase winding and the second V-phase winding are connected in parallel with each other; and the first W-phase winding and the second W-phase winding are connected in parallel with each other. Accordingly, since the windings at mechanically close positions are connected in series with each other, the wire connection is easily carried out.

When the number of poles M is equal to 14n and, out of the 18n number of teeth of the stator core, coils that are wound around the eighteen teeth consecutively from an 18(n−1)+1-th tooth to an 18(n−1)+18-th tooth are set to be coils U11, V11, V12, W11, U12, U13, V13, W12, W13, U21, V21, V22, W21, U22, U23, V23, W22 and W23, respectively, the coils U11, U13 and U22 are connected in series with each other, and configure a first U-phase winding which is one U-phase 3-phase armature winding that forms the parallel circuits; the coils U12, U21 and U23 are connected in series with each other, and configure a second U-phase winding which is another U-phase 3-phase armature winding that forms the parallel circuits; the coils V11, V13 and V22 are connected in series with each other, and configure a first V-phase winding which is one V-phase 3-phase armature winding that forms the parallel circuits; the coils V12, V21 and V23 are connected in series with each other, and configure a second V-phase winding which is another V-phase 3-phase armature winding that forms the parallel circuits; the coils W12, W21 and W23 are connected in series with each other, and configure a first W-phase winding which is one W-phase 3-phase armature winding that forms the parallel circuits; the coils W11, W13 and W22 are connected in series with each other, and configure a second W-phase winding which is another W-phase 3-phase armature winding that forms the parallel circuits; the first U-phase winding and the second U-phase winding are connected in parallel with each other; the first V-phase winding and the second V-phase winding are connected in parallel with each other; and the first W-phase winding and the second W-phase winding are connected in parallel with each other. Accordingly, even in a case where currents of the two armature windings that form the parallel circuits are unbalanced, since electromagnetic force exerted on the rotor is small, low vibration and low noise are obtained.

When the number of poles M is equal to 14n and, out of the 18n number of teeth of the stator core, coils that are wound around the eighteen teeth consecutively from an 18(n−1)+1-th tooth to an 18(n−1)+18-th tooth are set to be coils U11, V11, V12, W11, U12, U13, V13, W12, W13, U21, V21, V22, W21, U22, U23, V23, W22 and W23, respectively, the coils U11, U12 and U13 are connected in series with each other, and configure a first U-phase winding which is one U-phase 3-phase armature winding that forms the parallel circuit; the coils U21, U22 and U23 are connected in series with each other, and configure a second U-phase winding which is another U-phase 3-phase armature winding that forms the parallel circuit; the coils V11, V12 and V13 are connected in series with each other, and configure a first V-phase winding which is one V-phase 3-phase armature winding that forms the parallel circuit; the coils V21, V22 and V23 are connected in series with each other, and configure a second V-phase winding which is another V-phase 3-phase armature winding that forms the parallel circuit; the coils W11, W12 and W13 are connected in series with each other, and configure a first W-phase winding which is one W-phase 3-phase armature winding that forms the parallel circuit; the coils W21, W22 and W23 are connected in series with each other, and configure a second W-phase winding which is another W-phase 3-phase armature winding that forms the parallel circuit; the first U-phase winding, the first V-phase winding and the first W-phase winding are fed with electrical power from a first inverter; and the second U-phase winding, the second V-phase winding and the second W-phase winding are fed with electrical power from a second inverter. Accordingly, when motor-side wirings are connected to sides of the drive circuit in the case where the two inverters are configured, since the three wirings for the first inverter and the three wirings for the second inverter are arranged at positions close to each other, the wiring between the motor and the inverters is easily carried out.

When the number of poles M is equal to 14n and, out of the 18n number of teeth of the stator core, coils that are wound around the eighteen teeth consecutively from the $18(n-1)+1$-th tooth to the $18(n-1)+18$-th tooth are set to be coils U11, V11, V12, W11, U12, U13, V13, W12, W13, U21, V21, V22, W21, U22, U23, V23, W22 and W23, respectively, the coils U11, U13 and U22 are connected in series with each other, and configure a first U-phase winding which is one U-phase 3-phase armature winding that forms the parallel circuit; the coils U12, U21 and U23 are connected in series with each other, and configure a second U-phase winding which is another U-phase 3-phase armature winding that forms the parallel circuit; the coils V11, V13 and V22 are connected in series with each other, and configure a first V-phase winding which is one V-phase 3-phase armature winding that forms the parallel circuit; the coils V12, V21 and V23 are connected in series with each other, and configure a second V-phase winding which is another V-phase 3-phase armature winding that forms the parallel circuit; the coils W12, W21 and W23 are connected in series with each other, and configure a first W-phase winding which is one W-phase 3-phase armature winding that forms the parallel circuit; the coils W11, W13 and W22 are connected in series with each other, and configure a second W-phase winding which is another W-phase 3-phase armature winding that forms the parallel circuit; the first U-phase winding, the first V-phase winding and the first W-phase winding are fed with electrical power from the first inverter; and the second U-phase winding, the second V-phase winding and the second W-phase winding are fed with electrical power from the second inverter. Accordingly, even in a case where currents are unbalanced at the first and the second armature windings to which separate inverters are respectively connected, since electromagnetic force exerted on the rotor is small, low vibration and low noise are obtained.

When the number of poles M is equal to 14 and the number of teeth N is equal to 18, since the number of poles is small, an angle error that is converted into an electrical angle of the rotary sensor becomes small. Accordingly, the motor is unlikely to be affected by an angle error of the rotary sensor, a torque ripple becomes small, and the motor with low vibration and low noise is obtained.

When the number of poles M is equal to 22n and, out of the 18n number of teeth of the stator core, coils that are wound around the eighteen teeth consecutively from an $18(n-1)+1$-th tooth to an $18(n-1)+18$-th tooth are set to be coils U11, W11, W12, V11, U12, U13, W13, V12, V13, U21, W21, W22, V21, U22, U23, W23, V22 and V23, respectively, the coils U11, U12 and U13 are connected in series with each other, and configure a first U-phase winding which is one U-phase 3-phase armature winding that forms the parallel circuits; the coils U21, U22 and U23 are connected in series with each other, and configure a second U-phase winding which is another U-phase 3-phase armature winding that forms the parallel circuits; the coils V11, V12 and V13 are connected in series with each other, and configure a first V-phase winding which is one V-phase 3-phase armature winding that forms the parallel circuits; the coils V21, V22 and V23 are connected in series with each other, and configure a second V-phase winding which is another V-phase 3-phase armature winding that forms the parallel circuits; the coils W11, W12 and W13 are connected in series with each other, and configure a first W-phase winding which is one W-phase 3-phase armature winding that forms the parallel circuits; and the coils W21, W22 and W23 are connected in series with each other, and configure a second W-phase winding which is another W-phase 3-phase armature winding that forms the parallel circuits. Accordingly, since the windings at mechanically close positions are connected in series with each other, the wire connection is easily carried out.

When the number of poles M is equal to 22n and, out of the 18n number of teeth of the stator core, coils that are wound around the eighteen teeth consecutively from the $18(n-1)+1$-th tooth to the $18(n-1)+18$-th tooth are set to be coils U11, W11, W12, V11, U12, U13, W13, V12, V13, U21, W21, W22, V21, U22, U23, W23, V22 and V23, respectively, the coils U11, U13 and U22 are connected in series with each other, and configure a first U-phase winding which is one U-phase 3-phase armature winding that forms the parallel circuits; the coils U12, U21 and U23 are connected in series with each other, and configure a second U-phase winding which is another U-phase 3-phase armature winding that forms the parallel circuits; the coils V11, V13 and V22 are connected in series with each other, and configure a first V-phase winding which is one V-phase 3-phase armature winding that forms the parallel circuits; the coils V12, V21 and V23 are connected in series with each other, and configure a second V-phase winding which is another V-phase 3-phase armature winding that forms the parallel circuits; the coils W12, W21 and W23 are connected in series with each other, and configure a first W-phase winding which is one W-phase 3-phase armature winding that forms the parallel circuits; and the coils W11, W13 and W22 are connected in series with each other, and configure a second W-phase winding which is another W-phase 3-phase armature winding that forms the parallel circuits. Accordingly, even in a case where currents are unbalanced at the first and the second armature windings, since electromagnetic force exerted on the rotor is small, low vibration and low noise are obtained.

The integer n is equal to 1; each of first U-phase, V-phase and W-phase windings, which is each phase winding of one 3-phase armature winding that forms the parallel circuits, is configured to have three coils, which are dispersedly arranged to be separated from each other at a mechanical angle of 100 degrees or greater, connected in series with each other; each of second U-phase, V-phase and W-phase windings, which is each phase winding of another 3-phase armature winding that forms the parallel circuits, is configured to have three coils, which are dispersedly arranged to be separated from each other at a mechanical angle of 100 degrees or greater, connected in series with each other; the first U-phase winding and the second U-phase winding are arranged at positions that are offset from each other at a mechanical angle of 180 degrees; the first V-phase winding and the second V-phase winding are arranged at positions that are offset from each other at a mechanical angle of 180 degrees; and the first W-phase winding and the second W-phase winding are arranged at positions that are offset from each other at a mechanical angle of 180 degrees. Accordingly, since the second-spatial order electromagnetic excitation force is small, low vibration and low noise are obtained. Since the number of poles is small, an angle error that is converted into an electrical angle of the rotary sensor becomes small. Accordingly, the motor is unlikely to be affected by an angle error of the rotary sensor, a torque ripple becomes small, and the motor with low vibration and low noise is obtained.

When a permanent magnet is arranged on the surface of the rotor core of the rotor, cogging torque and a torque ripple are small. Since gaps are present which are equivalent to the thicknesses of the permanent magnets in the radial direction, even though an eccentricity occurs between the rotor and the stator, an electromagnetic force is small, and vibration and noise are small.

Since a permanent magnet is embedded in the rotor core of the rotor, there is a problem in that, in the structure in which the permanent magnet is embedded in the rotor core, an electromagnetic excitation force becomes great compared to in the surface magnet type motor and vibration and noise become great. However, in the configuration, it is possible to make the second-spatial order electromagnetic excitation force small, and low vibration and low noise are obtained.

When a permanent magnet having a length in the radial direction of the rotor greater than that in the circumferential direction of the rotor is embedded in the rotor core of the rotor, since the permanent magnet has the radial length greater than the circumferential length, a magnetic flux can be concentrated on the rotor core and thus, high torque is obtained. In the structure in which the permanent magnet is embedded in the rotor core, there is a problem in that an electromagnetic excitation force becomes great compared to in the surface magnet type motor and vibration and noise become great. However, in the configuration, it is possible to make the second-spatial order electromagnetic excitation force small, and low vibration and low noise are obtained.

The permanent magnet attached to the rotor core of the rotor has a rectangular cross-sectional shape, the permanent magnet has a long shape in which the length in the radial direction of the rotor is greater than the length in the circumferential direction of the rotor, the permanent magnets are magnetized to have magnetization directions in which facing surfaces of adjacent permanent magnets have the same polarity, the rotor core is interposed between the adjacent permanent magnets, the rotor core has a curved surface portion that faces a side of the stator, the curved surface has a convex shape in such a manner that a void between the curved surface and the stator has a small length at a midpoint between the adjacent permanent magnets, and a nonmagnetic portion is provided to be in contact with an end surface on a side of an inner diameter of the permanent magnet. Since the permanent magnet has a rectangular cross-sectional shape, it is possible to reduce magnet processing cost, and since material yield of the magnet is good, effects of cost reduction are obtained. Since a magnetic flux density waveform is smoothened by the curved surface portion, cogging torque and a torque ripple are reduced. Since the permanent magnet has the radial length greater than the circumferential length, a magnetic flux can be concentrated on the rotor core and thus, high torque is obtained. In the structure in which the permanent magnet is embedded in the rotor core, there is a problem in that an electromagnetic excitation force becomes great compared to in the surface magnet type motor and vibration and noise become great. However, in the configuration, it is possible to make the second-spatial order electromagnetic excitation force small, and low vibration and low noise are obtained.

The permanent magnet type concentrated winding motor is mounted on an electric power steering apparatus, and the permanent magnet type concentrated winding motor mounted on the electric power steering apparatus is arranged in parallel with the movement direction of the rack shaft of the electric power steering apparatus. Accordingly, it is possible to make the second-spatial order electromagnetic excitation force small, and low vibration and low noise are obtained. Furthermore, it is possible to achieve both high torque, and low vibration and low noise. There is a problem in that vibration and noise are also increased due to a high-output motor. However, since low vibration and low noise can be achieved, the electric power steering apparatus can be applied even for a large-sized vehicle, and fuel economy can be improved.

In the present invention, modifications or omissions can be appropriately made to each of the embodiments without departing from the scope of the present invention.

In each of the drawings, the same reference signs indicate the same or equivalent portions.

REFERENCE SIGNS LIST

AW, AW1 and AW2: armature winding
Cn: connection portion
CSP: curved surface portion
Inv, Inv1 and Inv2: inverter
M: permanent magnet concentrated wiring motor
NMP: nonmagnetic portion
PM1 to PM22: magnetic pole
RC: rotor core
RMD: movement direction of rack shaft
Rr: rotor
SC: stator core
Sr: stator
T1 to T18: teeth
U11, V11, V12, W11, U12, U13, V13, W12, W13, U21, V21, V22, W21, U22, U23, V23, W22 and W23: coil

The invention claimed is:

1. A permanent magnet type concentrated winding motor system, comprising:
a rotor has magnetic poles that are configured to have magnetized permanent magnets, and the number of the magnetic poles is M,
a stator has teeth around which coils are wound in a concentrated manner and which are circumferentially arranged at equal intervals, and the number of the teeth is N,
the number of the poles M is equal to (18±4)n, and the number of the teeth N is equal to 18n (n is an integer and n≥1),
an armature winding formed by the coils is configured to have an m number of 3-phase armature windings that form parallel circuits (m is an even number that is 2 or greater, and is a divisor of 2n), and
a 1-phase circuit of each of the 3-phase armature windings that form the parallel circuits is configured to have a 6n/m number of coils connected in series with each other,
wherein each of the m number of the 3-phase armature windings that form the parallel circuits is fed with electrical power from different inverters individually or from a common inverter,
and wherein
the number of the poles M is equal to 14n, and
when, out of the 18n number of teeth of the stator, coils that are wound around the eighteen teeth consecutively from an 18(n−1)+1-th tooth to an 18(n−1)+18-th tooth are set to be coils U11, V11, V12, W11, U12, U13, V13, W12, W13, U21, V21, V22, W21, U22, U23, V23, W22 and W23, respectively,
the coils U11, U12 and U13 are connected in series with each other, and configure a first U-phase winding which is one U-phase of the 3-phase armature winding that forms the parallel circuits,
the coils U21, U22 and U23 are connected in series with each other, and configure a second U-phase winding which is another U-phase of the 3-phase armature winding that forms the parallel circuits, the coils V11, V12 and V13 are connected in series with each other, and configure a first V-phase winding which is one V-phase of the 3-phase armature winding that forms the parallel circuits, the coils V21, V22 and V23 are connected in series with each other, and configure a second V-phase winding which is another V-phase of the 3-phase armature winding that forms the parallel circuits, the coils W11, W12 and W13 are connected in series with each other, and configure a first W-phase winding which is one W-phase of the 3-phase armature winding that forms the parallel circuits, the coils W21, W22 and W23 are connected in series with each other, and configure a second W-phase winding which is another W-phase of the 3-phase armature winding that forms the parallel circuits, the first U-phase winding and the second U-phase winding are connected in parallel with each other, the first V-phase winding and the second V-phase winding are connected in parallel with each other, and the first W-phase winding and the second W-phase winding are connected in parallel with each other.

2. A permanent magnet type concentrated winding motor system, comprising, a rotor has magnetic poles that are configured to have magnetized permanent magnets, and the number of the magnetic poles is M, a stator has teeth around which coils are wound in a concentrated manner and which are circumferentially arranged at equal intervals, and the number of the teeth is N, the number of the poles M is equal to $(18\pm4)n$, and the number of the teeth N is equal to 18n (n is an integer and n≥1), an armature winding formed by the coils is configured to have an m number of 3-phase armature windings that form parallel circuits (m is an even number that is 2 or greater, and is a divisor of 2n), and a 1-phase circuit of each of the 3-phase armature windings that form the parallel circuits is configured to have a 6n/m number of coils connected in series with each other, wherein each of the m number of the 3-phase armature windings that form the parallel circuits is fed with electrical power from different inverters individually or from a common inverter, and wherein the number of the poles M is equal to 14n, and when, out of the 18n number of teeth of a stator core of the rotor, coils that are wound around the eighteen teeth consecutively from an 18(n−1)+1-th tooth to an 18(n−1)+18-th tooth are set to be coils U11, V11, V12, W11, U12, U13, V13, W12, W13, U21, V21, V22, W21, U22, U23, V23, W22 and W23, respectively, the coils U11, U13 and U22 are connected in series with each other, and configure a first U-phase winding which is one U-phase of the 3-phase armature winding that forms the parallel circuits, the coils U12, U21 and U23 are connected in series with each other, and configure a second U-phase winding which is another U-phase of the 3-phase armature winding that forms the parallel circuits, the coils V11, V13 and V22 are connected in series with each other, and configure a first V-phase winding which is one V-phase of the 3-phase armature winding that forms the parallel circuits, the coils V12, V21 and V23 are connected in series with each other, and configure a second V-phase winding which is another V-phase of the 3-phase armature winding that forms the parallel circuits, the coils W12, W21 and W23 are connected in series with each other, and configure a first W-phase winding which is one W-phase of the 3-phase armature winding that forms the parallel circuits, the coils W11, W13 and W22 are connected in series with each other, and configure a second W-phase winding which is another W-phase of the 3-phase armature winding that forms the parallel circuits, the first U-phase winding and the second U-phase winding are connected in parallel with each other, the first V-phase winding and the second V-phase winding are connected in parallel with each other, and the first W-phase winding and the second W-phase winding are connected in parallel with each other.

3. A permanent magnet type concentrated winding motor system, comprising:

a rotor has magnetic poles that are configured to have magnetized permanent magnets, and the number of the magnetic poles is M, a stator has teeth around which coils are wound in a concentrated manner and which are circumferentially arranged at equal intervals, and the number of the teeth is N, the number of the poles M is equal to $(18\pm4)n$, and the number of the teeth N is equal to 18n (n is an integer and n≥1), an armature winding formed by the coils is configured to have an m number of 3-phase armature windings that form parallel circuits (m is an even number that is 2 or greater, and is a divisor of 2n), and a 1-phase circuit of each of the 3-phase armature windings that form the parallel circuits is configured to have a 6n/m number of coils connected in series with each other, wherein each of the m number of the 3-phase armature windings that form the parallel circuits is fed with electrical power from different inverters individually or from a common inverter, and wherein the number of the poles M is equal to 14n, and when, out of the 18n number of teeth of a stator core of the stator, coils that are wound around the eighteen teeth consecutively from an 18(n−1)+1-th tooth to an 18(n−1)+18-th tooth are set to be coils U11, V11, V12, W11, U12, U13, V13, W12, W13, U21, V21, V22, W21, U22, U23, V23, W22 and W23, respectively, the coils U11, U12 and U13 are connected in series with each other, and configure a first U-phase winding which is one U-phase of the 3-phase armature winding that forms the parallel circuits, the coils U21, U22 and U23 are connected in series with each other, and configure a second U-phase winding which is another U-phase of the 3-phase armature winding that forms the parallel circuits, the coils V11, V12 and V13 are connected in series with each other, and configure a first V-phase winding which is one V-phase of the 3-phase armature winding that forms the parallel circuits, the coils V21, V22 and V23 are connected in series with each other, and configure a second V-phase winding which is another V-phase of the 3-phase armature winding that forms the parallel circuits, the coils W11, W12 and W13 are connected in series with each other, and configure a first W-phase winding which is one W-phase of the 3-phase armature winding that forms the parallel circuits, the coils W21, W22 and W23 are connected in series with each other, and configure a second W-phase winding which is another W-phase of the 3-phase armature winding that forms the parallel circuits, the first U-phase winding, the first V-phase winding and the first W-phase winding are fed with electrical power from a first inverter, and the second U-phase winding, the second V-phase winding and the second W-phase winding are fed with electrical power from a second inverter.

4. A permanent magnet type concentrated winding motor system, comprising:

a rotor has magnetic poles that are configured to have magnetized permanent magnets, and the number of the magnetic poles is M, a stator has teeth around which coils are wound in a concentrated manner and which are circumferentially arranged at equal intervals, and the number of the teeth is N, the number of the poles M is equal to (18±4)n, and the number of the teeth N is equal to 18n (n is an integer and n≥1), an armature winding formed by the coils is configured to have an m number of 3-phase armature windings that form parallel circuits (m is an even number that is 2 or greater, and is a divisor of 2n), and a 1-phase circuit of each of the 3-phase armature windings that form the parallel circuits is configured to have a 6n/m number of coils connected in series with each other, wherein each of the m number of the 3-phase armature windings that form the parallel circuits is fed with electrical power from different inverters individually or from a common inverter, and wherein the number of the poles M is equal to 14n, and when, out of the 18n number of teeth of a stator core of the stator, coils that are wound around the eighteen teeth consecutively from an 18(n−1)+1-th tooth to an 18(n−1)+18-th tooth are set to be coils U11, V11, V12, W11, U12, U13, V13, W12, W13, U21, V21, V22, W21, U22, U23, V23, W22 and W23, respectively, the coils U11, U13 and U22 are connected in series with each other, and configure a first U-phase winding which is one U-phase of the 3-phase armature winding that forms the parallel circuits, the coils U12, U21 and U23 are connected in series with each other, and configure a second U-phase winding which is another U-phase of the 3-phase armature winding that forms the parallel circuits, the coils V11, V13 and V22 are connected in series with each other, and configure a first V-phase winding which is one V-phase of the 3-phase armature winding that forms the parallel circuits, the coils V12, V21 and V23 are connected in series with each other, and configure a second V-phase winding which is another V-phase of the 3-phase armature winding that forms the parallel circuits, the coils W12, W21 and W23 are connected in series with each other, and configure a first W-phase winding which is one W-phase of the 3-phase armature winding that forms the parallel circuits, the coils W11, W13 and W22 are connected in series with each other, and configure a second W-phase winding which is another W-phase of the 3-phase armature winding that forms the parallel circuits, the first U-phase winding, the first V-phase winding and the first W-phase winding are fed with electrical power from a first inverter, and the second U-phase winding, the second V-phase winding and the second W-phase winding are fed with electrical power from a second inverter.

5. A permanent magnet type concentrated winding motor system, comprising:

a rotor has magnetic poles that are configured to have magnetized permanent magnets, and the number of the magnetic poles is M, a stator has teeth around which coils are wound in a concentrated manner and which are circumferentially arranged at equal intervals, and the number of the teeth is N, the number of the poles M is equal to (18±4)n, and the number of the teeth N is equal to 18n (n is an integer and n≥1), an armature winding formed by the coils is configured to have an m number of 3-phase armature windings that form parallel circuits (m is an even number that is 2 or greater, and is a divisor of 2n), and a 1-phase circuit of each of the 3-phase armature windings that form the parallel circuits is configured to have a 6n/m number of coils connected in series with each other, wherein each of the m number of the 3-phase armature windings that form the parallel circuits is fed with electrical power from different inverters individually or from a common inverter, and wherein the number of the poles M is equal to 22n, and when, out of the 18n number of teeth of a stator core of the stator, coils that are wound around the eighteen teeth consecutively from an 18(n−1)+1-th tooth to an 18(n−1)+18-th tooth are set to be coils U11, W11, W12, V11, U12, U13, W13, V12, V13, U21, W21, W22, V21, U22, U23, W23, V22 and V23, respectively, the coils U11, U12 and U13 are connected in series with each other, and configure a first U-phase winding which is one U-phase of the 3-phase armature winding that forms the parallel circuits, the coils U21, U22 and U23 are connected in series with each other, and configure a second U-phase winding which is another U-phase of the 3-phase armature winding that forms the parallel circuits, the coils V11, V12 and V13 are connected in series with each other, and configure a first V-phase winding which is one V-phase of the 3-phase armature winding that forms the parallel circuits, the coils V21, V22 and V23 are connected in series with each other, and configure a second V-phase winding which is another V-phase of the 3-phase armature winding that forms the parallel circuits, the coils W11, W12 and W13 are connected in series with each other, and configure a first W-phase winding which is one W-phase of the 3-phase armature winding that forms the parallel circuits, and the coils W21, W22 and W23 are connected in series with each other, and configure a second W-phase winding which is another W-phase of the 3-phase armature winding that forms the parallel circuits.

6. A permanent magnet type concentrated winding motor system, comprising:
- a rotor has magnetic poles that are configured to have magnetized permanent magnets, and the number of the magnetic poles is M,
- a stator has teeth around which coils are wound in a concentrated manner and which are circumferentially arranged at equal intervals, and the number of the teeth is N,
- the number of the poles M is equal to (18±4)n, and the number of the teeth N is equal to 18n (n is an integer and n≥1),
- an armature winding formed by the coils is configured to have an m number of 3-phase armature windings that form parallel circuits (m is an even number that is 2 or greater, and is a divisor of 2n), and
- a 1-phase circuit of each of the 3-phase armature windings that form the parallel circuits is configured to have a 6n/m number of coils connected in series with each other,
- wherein each of the m number of the 3-phase armature windings that form the parallel circuits is fed with electrical power from different inverters individually or from a common inverter, and wherein
- the number of the poles M is equal to 22n, and
- when, out of the 18n number of teeth of a stator core of the stator, coils that are wound around the eighteen teeth consecutively from an 18(n−1)+1-th tooth to an 18(n−1)+18-th tooth are set to be coils U11, W11, W12, V11, U12, U13, W13, V12, V13, U21, W21, W22, V21, U22, U23, W23, V22 and V23, respectively,
- the coils U11, U13 and U22 are connected in series with each other, and configure a first U-phase winding which is one U-phase of the 3-phase armature winding that forms the parallel circuits,
- the coils U12, U21 and U23 are connected in series with each other, and configure a second U-phase winding which is another U-phase of the 3-phase armature winding that forms the parallel circuits,
- the coils V11, V13 and V22 are connected in series with each other, and configure a first V-phase winding which is one V-phase of the 3-phase armature winding that forms the parallel circuits,
- the coils V12, V21 and V23 are connected in series with each other, and configure a second V-phase winding which is another V-phase of the 3-phase armature winding that forms the parallel circuits,
- the coils W12, W21 and W23 are connected in series with each other, and configure a first W-phase winding which is one W-phase of the 3-phase armature winding that forms the parallel circuits, and
- the coils W11, W13 and W22 are connected in series with each other, and configure a second W-phase winding which is another W-phase of the 3-phase armature winding that forms the parallel circuits.

7. A permanent magnet type concentrated winding motor system, comprising:
- a rotor has magnetic poles that are configured to have magnetized permanent magnets, and the number of the magnetic poles is M,
- a stator has teeth around which coils are wound in a concentrated manner and which are circumferentially arranged at equal intervals, and the number of the teeth is N,
- the number of the poles M is equal to (18±4)n, and the number of the teeth N is equal to 18n (n is an integer and n≥1),
- an armature winding formed by the coils is configured to have an m number of 3-phase armature windings that form parallel circuits (m is an even number that is 2 or greater, and is a divisor of 2n), and
- a 1-phase circuit of each of the 3-phase armature windings that form the parallel circuits is configured to have a 6n/m number of coils connected in series with each other,
- wherein each of the m number of the 3-phase armature windings that form the parallel circuits is fed with electrical power from different inverters individually or from a common inverter, and wherein
- the integer n is equal to 1,
- each of first U-phase, V-phase and W-phase windings, which is each phase winding of one 3-phase armature winding that forms the parallel circuits, is configured to have three coils, which are dispersedly arranged to be separated from each other at a mechanical angle of 100 degrees or greater, connected in series with each other, and each of second U-phase, V-phase and W-phase windings, which is each phase winding of another 3-phase armature winding that forms the parallel circuits, is configured to have three coils, which are dispersedly arranged to be separated from each other at a mechanical angle of 100 degrees or greater, connected in series with each other,
- the first U-phase winding and the second U-phase winding are arranged at positions that are offset from each other at a mechanical angle of 180 degrees,
- the first V-phase winding and the second V-phase winding are arranged at positions that are offset from each other at a mechanical angle of 180 degrees, and
- the first W-phase winding and the second W-phase winding are arranged at positions that are offset from each other at a mechanical angle of 180 degrees.

8. A permanent magnet type concentrated winding motor system, comprising:
- a rotor has magnetic poles that are configured to have magnetized permanent magnets, and the number of the magnetic poles is M,
- a stator has teeth around which coils are wound in a concentrated manner and which are circumferentially arranged at equal intervals, and the number of the teeth is N,
- the number of the poles M is equal to (18±4)n, and the number of the teeth N is equal to 18n (n is an integer and n≥1),
- an armature winding formed by the coils is configured to have an m number of 3-phase armature windings that form parallel circuits (m is an even number that is 2 or greater, and is a divisor of 2n), and
- a 1-phase circuit of each of the 3-phase armature windings that form the parallel circuits is configured to have a 6n/m number of coils connected in series with each other,
- wherein each of the m number of the 3-phase armature windings that form the parallel circuits is fed with electrical power from different inverters individually or from a common inverter,
- and herein the permanent magnet having a length in a radial direction of the rotor greater than a length in a circumferential direction of the rotor is embedded in a rotor core of the rotor.

9. A permanent magnet type concentrated winding motor system, comprising:
- a rotor has magnetic poles that are configured to have magnetized permanent magnets, and the number of the magnetic poles is M,
- a stator has teeth around which coils are wound in a concentrated manner and which are circumferentially arranged at equal intervals, and the number of the teeth is N,
- the number of the poles M is equal to $(18\pm4)n$, and the number of the teeth N is equal to 18n (n is an integer and $n \geq 1$),
- an armature winding formed by the coils is configured to have an m number of 3-phase armature windings that form parallel circuits (m is an even number that is 2 or greater, and is a divisor of 2n), and
- a 1-phase circuit of each of the 3-phase armature windings that form the parallel circuits is configured to have a 6n/m number of coils connected in series with each other,
- wherein each of the m number of the 3-phase armature windings that form the parallel circuits is fed with electrical power from different inverters individually or from a common inverter, and wherein
- the permanent magnet attached to a rotor core of the rotor has a rectangular cross-sectional shape, and the permanent magnet has a long shape in which a length in a radial direction of the rotor is greater than a length in a circumferential direction of the rotor,
- the permanent magnets are magnetized to have magnetization directions in which facing surfaces of adjacent permanent magnets have the same polarity,
- the rotor core is interposed between the adjacent permanent magnets,
- the rotor core has a curved surface portion that faces a side of the stator, and the curved surface has a convex shape in such a manner that an air gap between the curved surface and the stator has a small length at a midpoint between the adjacent permanent magnets, and
- a nonmagnetic portion is provided to be in contact with an end surface on a side of an inner diameter of the permanent magnet.

10. A permanent magnet type concentrated winding motor system, comprising:
- a rotor has magnetic poles that are configured to have magnetized permanent magnets, and the number of the magnetic poles is M,
- a stator has teeth around which coils are wound in a concentrated manner and which are circumferentially arranged at equal intervals, and the number of the teeth is N,
- the number of the poles M is equal to $(18\pm4)n$, and the number of the teeth N is equal to 18n (n is an integer and $n \geq 1$),
- an armature winding formed by the coils is configured to have an m number of 3-phase armature windings that form parallel circuits (m is an even number that is 2 or greater, and is a divisor of 2n), and
- a 1-phase circuit of each of the 3-phase armature windings that form the parallel circuits is configured to have a 6n/m number of coils connected in series with each other,
- wherein each of the m number of the 3-phase armature windings that form the parallel circuits is fed with electrical power from different inverters individually or from a common inverter,
- and wherein the permanent magnet type concentrated winding motor is mounted on an electric power steering apparatus, and the permanent magnet type concentrated winding motor mounted on the electric power steering apparatus is arranged in parallel with a movement direction of a rack shaft of the electric power steering apparatus.

* * * * *